(12) United States Patent
Hawley

(10) Patent No.: US 6,343,294 B1
(45) Date of Patent: Jan. 29, 2002

(54) DATA FILE EDITOR FOR MULTIPLE DATA SUBSETS

(75) Inventor: Allen Kent Hawley, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,543

(22) Filed: Dec. 15, 1998

(51) Int. Cl.[7] .............................................. G06F 17/30
(52) U.S. Cl. ....................................... 707/103; 707/104
(58) Field of Search .................................. 707/3, 4, 101, 707/102, 103, 104, 201, 203; 709/227, 332; 717/5; 705/26, 2, 3, 1; 283/72; 600/300

(56) References Cited

U.S. PATENT DOCUMENTS

| | | | | |
|---|---|---|---|---|
| 5,262,943 A | * | 11/1993 | Thibado et al. | 600/300 |
| 5,615,400 A | * | 3/1997 | Cowsar et al. | 709/332 |
| 5,838,965 A | * | 11/1998 | Kavanagh et al. | 707/103 |
| 5,960,199 A | * | 9/1999 | Brodsky et al. | 707/104 |
| 6,082,776 A | * | 7/2000 | Feinberg | 283/72 |
| 6,182,107 B1 | * | 1/2001 | Atsatt | 709/100 |
| 6,208,993 B1 | * | 3/2001 | Shadmon | 707/102 |
| 5,787,274 A1 | * | 7/2001 | Agrawal et al. | 707/104 |

* cited by examiner

Primary Examiner—Diane D. Mizrahi
(74) Attorney, Agent, or Firm—Gates & Cooper LLP

(57) ABSTRACT

A method, apparatus, article of manufacture, and a memory structure for designing and displaying data subsets formed from a file of data records is disclosed. Data subsets are defined, and a data subset object is created that includes a list of Record IDs identifying data records that are members of the defined data subset. The data subset object belongs to a set ID class having a Record ID subclass and a subset subclass. If the Set ID class is instantiated as a subset subclass, the data records listed in the Record ID list are retrieved incrementally, according to the Record ID list. If the Set ID class is instantiated as a Record ID subclass, data records are incrementally retrieved from the data file.

34 Claims, 24 Drawing Sheets

| Operator | Operand1 | Operand2 | Match Criteria | Destination | Operation |
|---|---|---|---|---|---|
| Search | SetID (file or subset) | | (1) String found in record (2) Fields="data" connected with boolean operators | SetID (subset) | Search a file or subset specified by Operand1 to create, append, or replace destination subset. |
| Copy | SetID (subset) | | | SetID (subset) | Replace destination subset with a copy of the Operand1 (source) subset. |
| Add | SetID (file or subset) | SetID (subset) | | SetID (subset) | Add subset specified by Operand2 to the file or subset specified by Operand1 and create, append, or replace the destination subset. |
| Subtract | SetID (file or subset) | SetID (subset) | (1) keys = (2) entire records = | SetID (subset) | Subtract the subset specified by Operand2 from the file or subset specified by Operand1 and create, append, or replace the destination subset. |
| Or | SetID (file or subset) | SetID (subset) | (1) keys = (2) entire records = | SetID (subset) | OR the subset specified by Operand2 to the file or subset specified by Operand1 and create, append, or replace the destination subset. |
| Exclusive Or | SetID (file or subset) | SetID (subset) | (1) keys = (2) entire records = | SetID (subset) | EXCLUSIVE OR the subset specified by Operand2 to the file or subset specified by Operand1 and create, append, or replace the destination subset. |
| And | SetID (file or subset) | SetID (subset) | (1) keys = (2) entire records = | SetID (subset) | AND the subset specified by Operand2 to the file or subset specified by Operand1 and create, append, or replace the destination subset. |
| Update | SetID (file or subset) | SetID (subset) | (1) keys = | SetID (subset) | The data in the subset specified by Operand2 is used to update the data in the file or subset specified by Operand1 and creates, appends, or replaces the destination subset. |

FIG. 24

DATA FILE EDITOR FOR MULTIPLE DATA SUBSETS

CROSS-REFERENCE TO RELATED APPLICATIONS

This application is related to the following co-pending and commonly assigned patent applications, both of which are hereby incorporated by reference herein:

Application Ser. No. 09/197,612, entitled "DAtA FILE EDITOR PRESENTING SEMI-FORMATTED VIEW," by Allen K. Hawley and Sheila I. Sholars, filed Nov. 23, 1998, now issued as U.S. Pat. No. 6,192,367; and Application Ser. No. 09/197,916, entitled "MULTI-FORMAT AND MULTI-VIEW SYNCHRONIZED DATA EDITOR," now pending by Rebecca M. Lau, Kevin J. Poole, and Sheila I. Sholars, filed Nov. 23, 1998.

BACKGROUND OF THE INVENTION

1. Field of the Invention

The present invention relates to systems and methods of displaying and editing data files, and in particular to a method and system for defining, displaying, and performing set operations on multiple subsets of data records.

2. Description of the Related Art

The Virtual Storage Access Method (VSAM) is a method for accessing data using a B+ tree organizational structure. VSAM data files include one or more VSAM data records, each with a plurality of data fields. VSAM data fields are editable by VSAM data editors. Typically, VSAM data records are presented to the user by reading them out of the VSAM data files and storing them in cache. A data formatter then operates on the cached data to associate each data record with a mark or a structure that points to the record (such as a record identifier or ID) in the file. To implement intelligent caching, data formatters are capable of identifying data records that will be retained and stored to the file, by placing appropriate marks in the file cache records.

In some circumstances, it is desirable to define a subset of data records for viewing, analysis and editing, rather than the entire set, and to save that subset for later use. For example, rather than view all of the records in the data file, the user may want to view and edit only those records which having certain entry value criteria (i.e. personal data records including an entry of 60145 for the zip code field) or data criteria (i.e. data entered in the preceding two days). This ability would allow the user to focus more directly on data fields of interest. Unfortunately, depending on how it is defined, the subset's size may approach that of the entire VSAM data file, and easily exceed the cache memory size.

It is also desirable to allow operations between defined data subsets. For example, the user may want to view and edit all data records entered in the preceding two days and for which the zip code entry is 60145.

As can be seen from the foregoing, there is a need to provide for defining arbitrary subsets of data records in a data file or files and for performing operations on these subsets without exceeding the cache capabilities of the datafile editor. The multiple data subset editor of the present invention satisfies that need.

SUMMARY OF THE INVENTION

To address the requirements described above, the present invention discloses a method, apparatus, article of manufacture, and a memory structure for defining and displaying data subsets formed from a file of data records.

Data subsets are defined, and a data subset object is created that includes a list of Record IDs identifying data records that are members of the defined data subset. The data subset object belongs to a Set ID class having a Record ID subclass and a subset subclass. If the Set ID class is instantiated as a subset subclass, the data records listed in the Record ID list are retrieved incrementally, according to the Record ID list. If the Set ID class is instantiated as a Record ID subclass, data records are incrementally retrieved from the data file. The article of manufacture comprises a data storage device tangibly embodying instructions to perform the method steps described above.

The apparatus comprises a means for creating a data subset object having a list of Record IDs identifying data records that are members of the data subset, and a means for incrementally retrieving the data records listed in the list of Record IDs. The data subset object belongs to a Set ID class having a Record ID subclass and a subset subclass. The data records listed in the Record ID list are incrementally retrieved when the Set ID class is instantiated as a subset subclass and incrementally retrieved records from a file of data records when the Set ID class is instantiated as a Record ID subclass.

The foregoing can be used to define multiple data subsets and to perform operations on those subsets to define additional data subsets. Additional data subsets can be defined with the use of a second search or find command describing a second search criteria, or may be defined by applying a search or find command specifying a search criteria to data subsets already created. Once multiple data subsets have been defined, set relationships between the subsets can be used to define additional data subsets.

This ability to define and perform operations involving two or more subsets has several advantages. First, the present invention alleviates the need for the user to compose and enter complex Boolean search strings. Hence, the present invention requires less display real estate and reduces the likelihood that the user will make errors. Second, the present invention allows the user to look at a subset instead of a file to compose the second search criteria. This is beneficial because a subset is ordinarily much smaller than a file, and because the records of interest are more likely to be immediately visible (i.e. much less scrolling is required to see a record with field(s) involved in the next search. Third, if re-searching is required, the present invention increases the search speed, because a subset can be searched more rapidly than a file. Fourth, the present invention can cache small subsets for later retrieval without having to re-search a large file. Finally, the present invention can perform operations (including Boolean operations) between subsets (or files) to form a third subset.

BRIEF DESCRIPTION OF THE DRAWINGS

Referring now to the drawings in which like reference numbers represent corresponding parts throughout:

FIG. 24 is a diagram presenting illustrative examples of subset operations.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
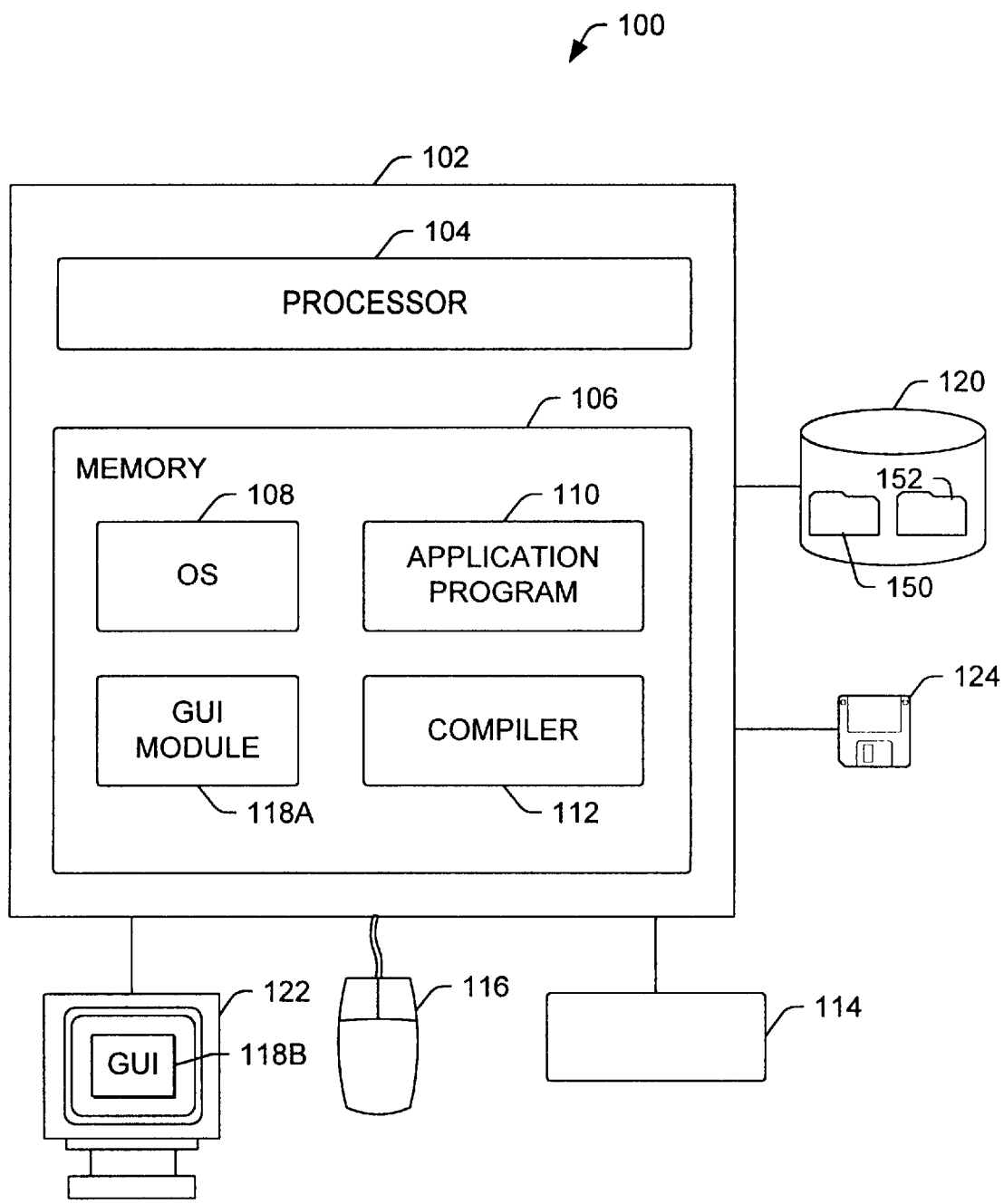
FIG. 1 is a block diagram showing an exemplary hardware environment for practicing the present invention.

FIG. 1 illustrates an exemplary computer system 100 used to implement a multiple browser and editor. The computer 102 comprises a processor 104 and a memory 106, such as random access memory (RAM). The computer 102 is operatively coupled to a display 122, which presents images to the user. The computer 102 may be coupled to other devices, such as a keyboard 114, a mouse device 116, a printer, or similar I/O device. Any combination of the above components, or any number of different components, peripherals, and other devices, may be used with the computer 102.

Generally, the user interfaces with the computer which accepts inputs and commands and presents results through a graphical user interface (GUI) module 118A and GUI 118B. Although the GUI module 118A is depicted as a separate module, the instructions performing the GUI functions can be resident or distributed in the operating system 108, the application program 110, or implemented with special purpose memory and/or processors.

The operating system 108 and computer application program 110 are comprised of instructions which, when read and executed by the computer 102, causes the computer 102 to perform the steps necessary to implement and/or use the present invention. Computer application program 110 and/or operating instructions may also be tangibly embodied in memory 106 and/or provided via data communications devices, thereby making a computer program product or article of manufacture according to the invention. As such, the terms "program storage device," "article of manufacture" and "computer program product" as used herein are intended to encompass a computer program accessible from any computer readable device or media. In one embodiment, instructions implementing the operating system 108, the computer program 110, and the compiler 112 are tangibly embodied in a computer-readable medium, e.g., data storage device 120, such as one or more fixed or removable data storage devices, a zip drive, floppy disc 124, hard drive, CD-ROM drive, tape drive, or other medium.

The computer 102 may also implement a compiler 112 which allows an application program 110 written in a programming language such as COBOL, C++, PL/I, FORTRAN, or other language to be translated into processor 104 readable code. After completion, the application program 110 accesses and manipulates data stored in the memory 106 of the computer 102 using the relationships and logic that was generated using the compiler 112.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Overview

The present invention comprises a multiple data record browser and editor that allows the user to view and edit data files, such as Virtual Storage Access Method (VSAM) files, from the user's workstation. VSAM is a widely used data storage method that uses a B+ data organization tree. The data file browser/editor provides a graphical interface that displays the data file in both unformatted and formatted forms simultaneously in the same window. Formatted records in the data file are displayed one at a time according to a data description such as a COBOL copy file, and unformatted records are displayed as character strings as found in the data file.

The data file browser editor allows the user to specify how the records are displayed. For example, the data records may be displayed in ASCII (American National Standard Code for Information Interchange), or EBCDIC (Extended Binary Coded Decimal Interchange Code). These views can be additionally extended to show its hexadecimal form. The data file browser/editor also allows the user to edit the record regardless of the code or the formatting selected. Data files are displayed as records in the window for the user to view, browse, edit, or delete. Provision is made for adding new records to the data file, creating new data files, and editing both the formatted and unformatted records.

The data file browser editor allows the user to define data record subsets and to present those subsets for viewing. Multiple data record subsets can be defined, and subsets can be combined in accordance with Boolean logic to define further data subsets. If desired, the data subsets can be saved for later use.

Presenting Data File Information

Figure 2:
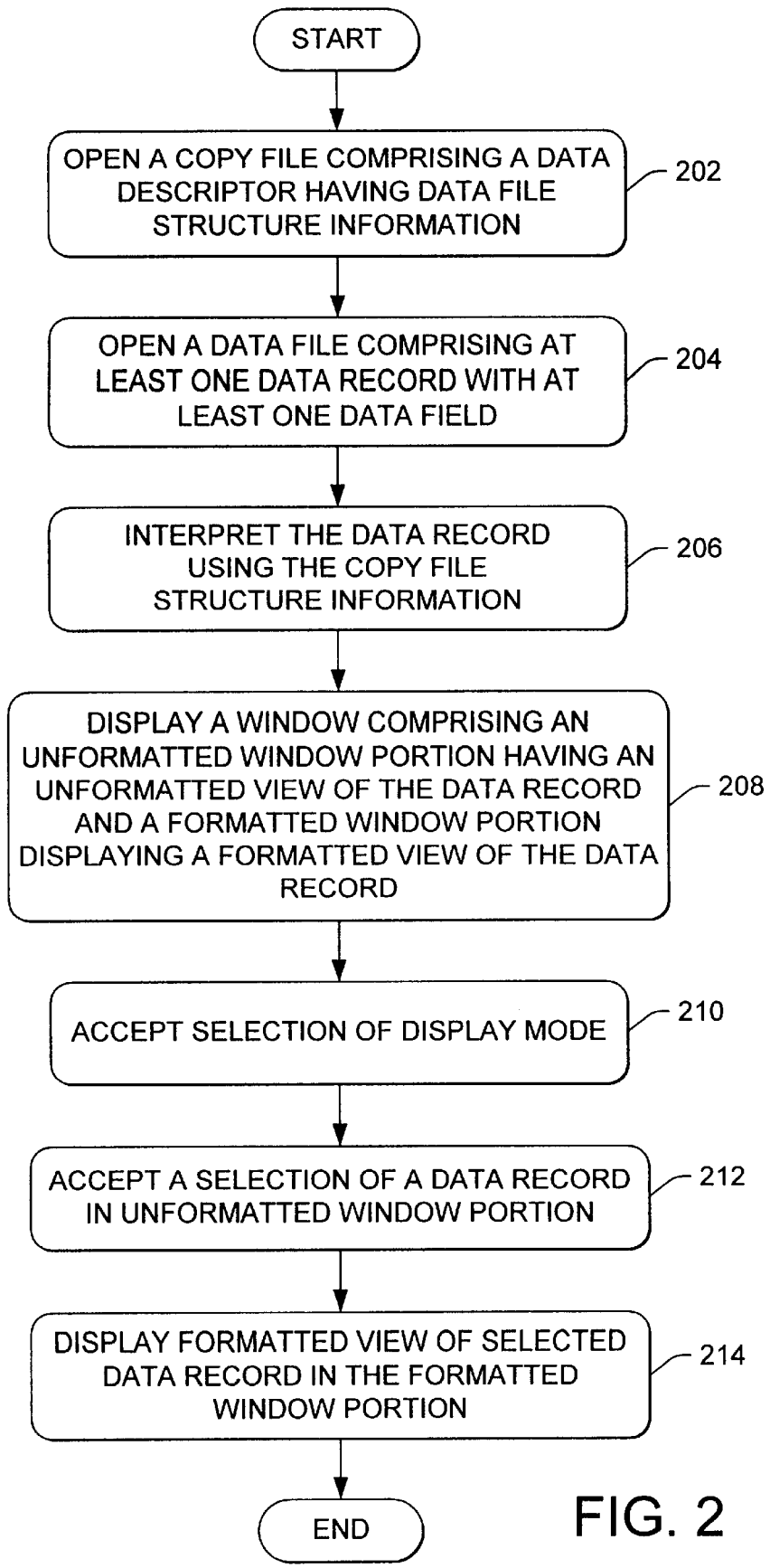
FIG. 2 is a flow chart presenting an illustrative example of process steps used in reporting context-sensitive comments to a destination.

FIG. 2 is a flow chart showing the operations used to present data information to the user. The operations described with respect to FIG. 2 will be described with reference to FIGS. 3–8 to show illustrative embodiments of the data file browser/editor user interface and to show additional operational details.

Figure 3:
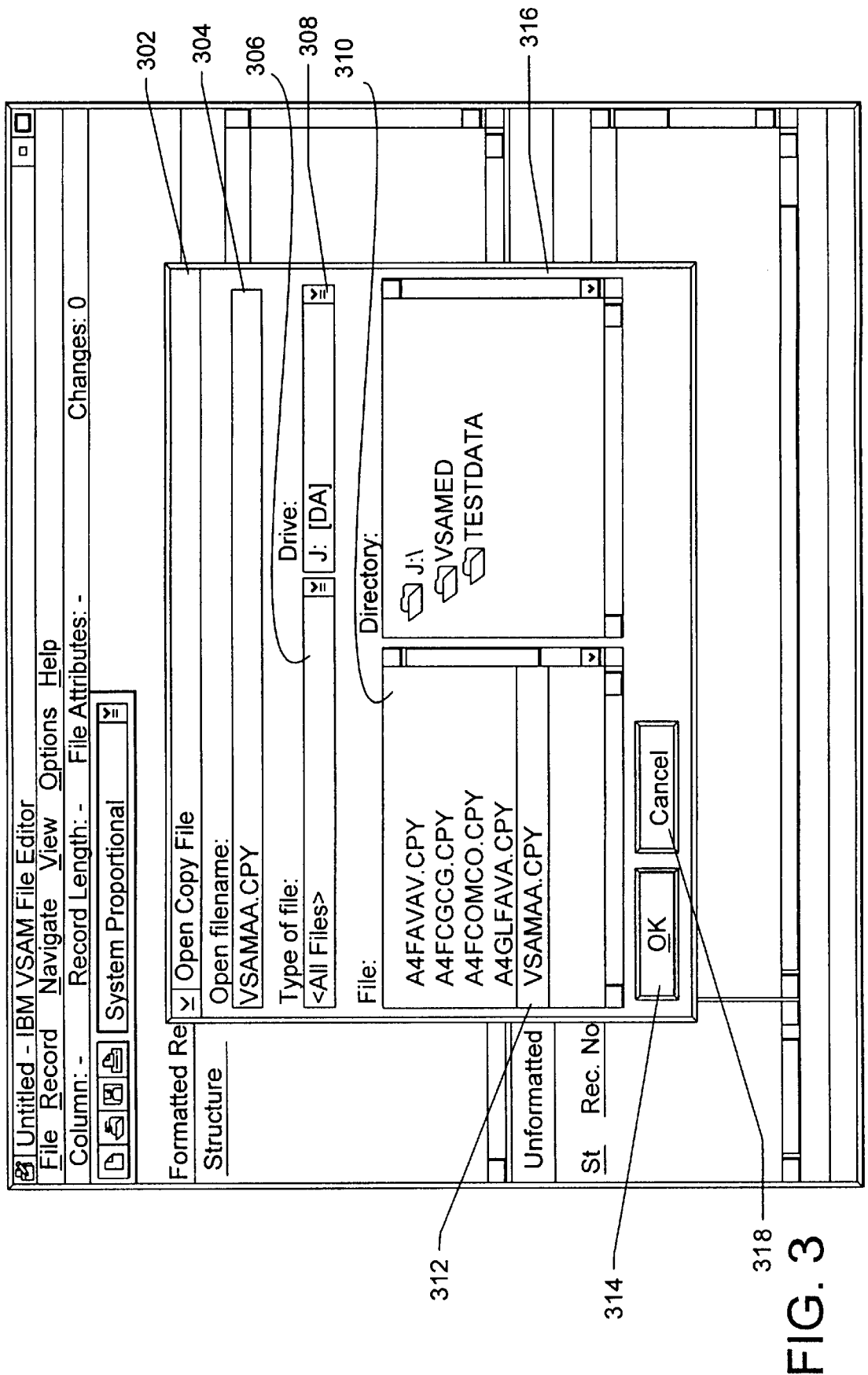
FIG. 3 is a diagram showing an illustrative embodiment of a copy file selection window.
Figure 4:
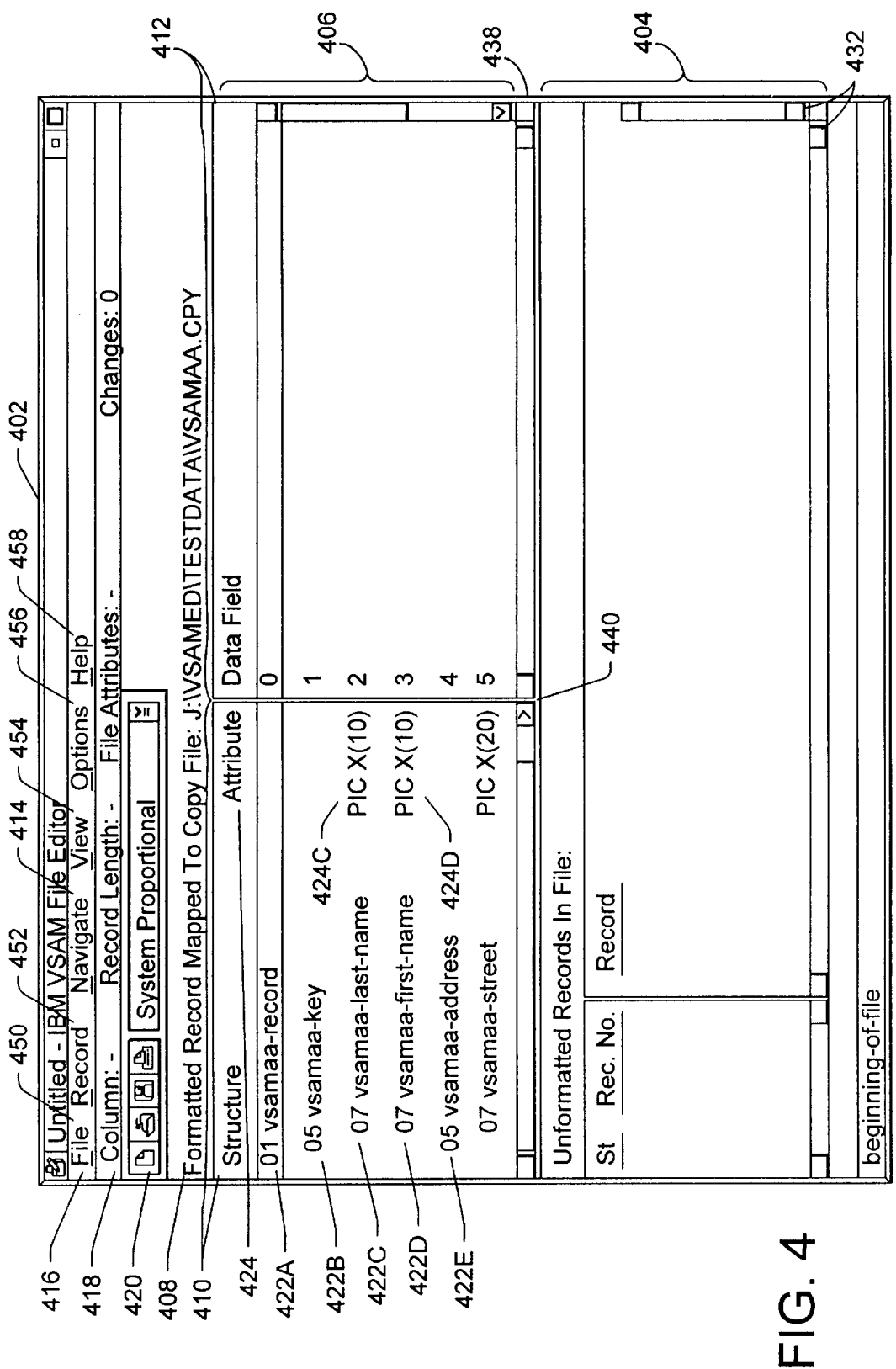
FIG. 4 shows the appearance of an exemplary embodiment of a data file browser/editor window after selection of a copy file.

The process begins by opening a file containing data record structure information. This is depicted in block 202. By way of example, for data used in connection with application programs 106 written in COBOL and complying with VSAM, the opened file is a COBOL copy file 150, and the data file structure information is described in one or more data descriptors and other information stored in the copy file 150. FIGS. 3 and 4 provide illustrative embodiments of a user interface for opening the copy file 150 and a data file browser/editor.

FIG. 3 is a diagram showing an illustrative embodiment of a copy file selection window 302 that can be used to open a file with data file structure information. The copy file selection window 302 comprises a file name entry box 304. The user may specify the desired copy file by typing the path to the copy file in this box. Alternatively, the user may search for the desired file using the directory drive selection box 308, the directory box 316, and the filename list box 312. File names displayed in the filename list box 312 are optionally filtered according to file type using the file type entry box 306. A file selected in the filename list box 312 can be automatically entered into the filename entry box 304 by double selecting the desired file.

In the example shown in FIG. 3, a copy file 150 named "VSAMAA.CPY" has been selected for opening. Once the name of the desired file appears in the file name entry box 304, the OK button 314 is depressed, and the selected copy file 150 is displayed in the editor. If the user selects the cancel button 318, the copy file selection window 302 disappears and the copy file 150 is not displayed in the editor.

FIG. 4 shows the appearance of an exemplary embodiment of a data file browser/editor window 402 after the copy file 150 has been selected. The data file browser/editor window 402 comprises a menu bar 416, a status bar 418, and a tool bar 420. The menu bar 416 presents the functions available to the user to select and manage data files and the data records therein. The menu bar 416 also allows the user to navigate through the files and to control the display of data in the data file browser/editor window 402 by selecting the "Navigate" pull down menu item 414.

The status bar 418 reflects the status of the data file. The "Column" entry in the status bar 418 denotes the column position of the cursor during editing. The "Record Length" entry in the status bar 418 indicates the length of the current record. The status bar 418 also indicates the file attributes (such as fixed or variable length, and the maximum length) the editor is using to display the records and the number of changes. The tool bar 420 comprises buttons that provide shortcuts to frequently used menu bar 418 selections.

The data file browser/editor window 402 also comprises an unformatted data window portion 404, and a formatted data window portion 406. The formatted data window portion 406 displays the current record, formatted according to the copy file 150 data description. Formatted view title area 408 indicates the name of the copy file 150 used to format the record displayed in the formatted data window portion 406.

In one embodiment, the formatted window portion 406 comprises a first formatted window sub-portion 410 and a second formatted window sub-portion 412. The first formatted window sub-portion 410 presents read-only column of data elements known as data descriptors 422A–422E (collectively referred to as data descriptors 422) read from the copy file 150. Data item attributes (collectively referred to as 424) of the data descriptors 422 are optionally displayed in a read-only column adjacent to the data descriptors 422 in the first formatted window sub-portion 410. For example, data descriptor 422C has an attribute 424C of PIC X(10), and attribute 422D is associated with an attribute 424D. The first formatted window sub-portion 410 and the second formatted window sub-portion 412 can also be separated by a user-movable split bar 440 and thus implemented as a windows "pane" allowing the boundary between the window sub-portions to be controlled by the user.

Collectively, data descriptors 422 and their associated attributes 424 define the structure of the data in the data files 152. For example, in the embodiment of the data file browser/editor 402 illustrated in FIG. 4, the copy file entitled "VSAMAA.CPY" as described with respect to FIG. 3 has been opened. The "VSAMAA.CPY" file comprises a hierarchical organization of data elements including a "record" data descriptor 422A, encompassing a "key" data descriptor 422B, and an "address" data descriptor 422E. The key data descriptor 422B encompasses a "last-name" data descriptor 422C, and a "first-name" data descriptor 422D, each with a 10 character string attribute. Data descriptors 422A, 422B, and 422E are group items, and data descriptors 422C and 422D are data items. Because the user in the foregoing example elected to begin by opening the copy file 150 first. Since a data file 152 has not been specified, the second formatted window sub-portion 412 and the unformatted window portion 404 are empty. The user may alternately elect to open the data file (as described below) before opening the copy file 150. In which case, data is read from the data file 152 and is presented to the user in an unformatted form in the unformatted window portion, until such time that a copy file 150 is opened.

The foregoing view of data descriptors presents a hierarchical view of the structure of the data. Although the illustrated example indicates a structure for a COBOL data structure, a similar display of the data structure can be presented for alternative programming languages such as PL/1, C, C++, FORTRAN, or other languages. In these instances, this view provides the user with visibility into inherited attributes and methods. It allows viewing of the different structure classes including any nesting characteristics.

In one embodiment, the copy file is also editable from the first formatted window sub-portion via a copy file editor, which allows the user to edit copy file information including attributes and data descriptors.

Figure 5:
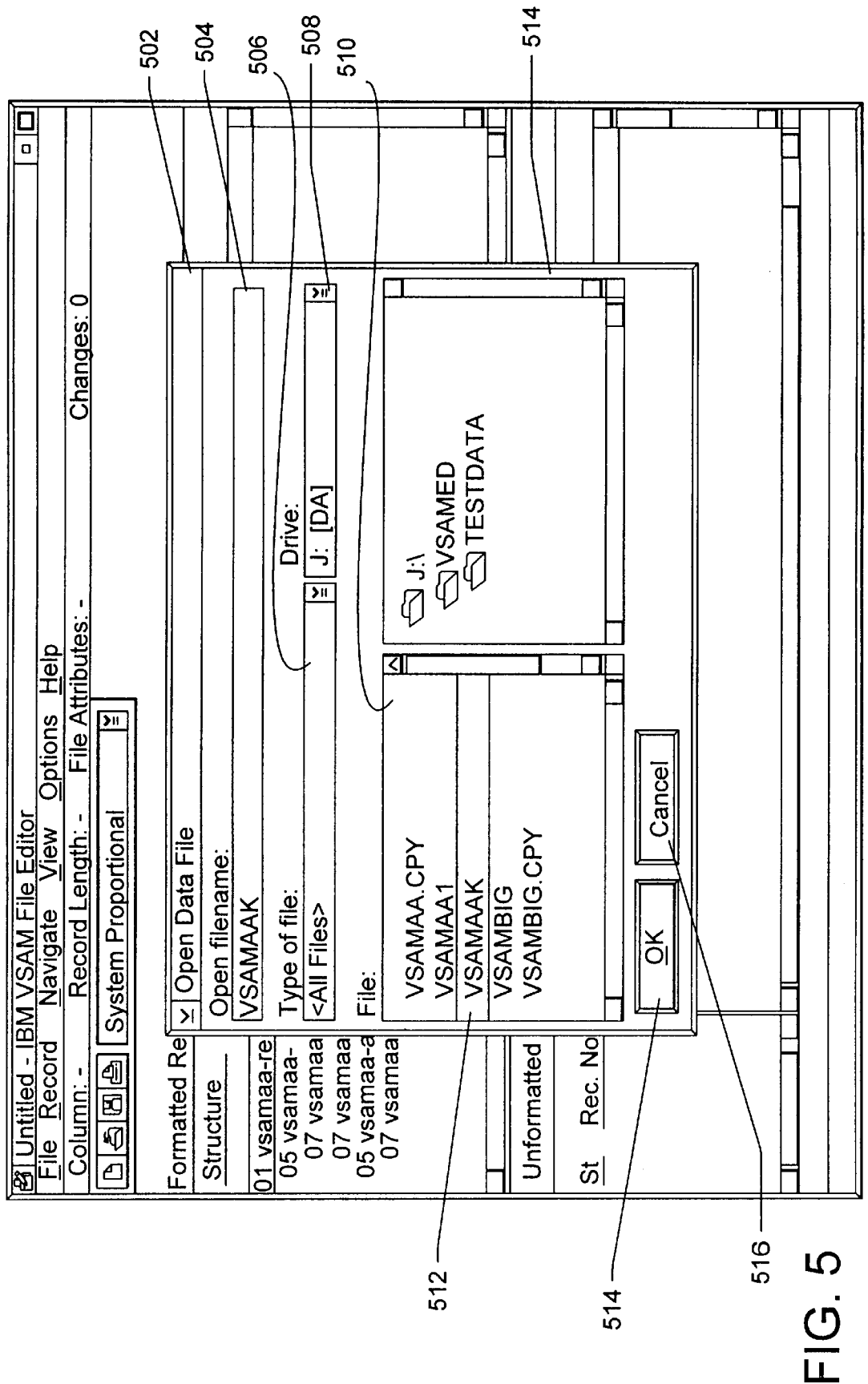
FIG. 5 is a diagram showing an illustrative embodiment of the data file selection window.
Figure 6:
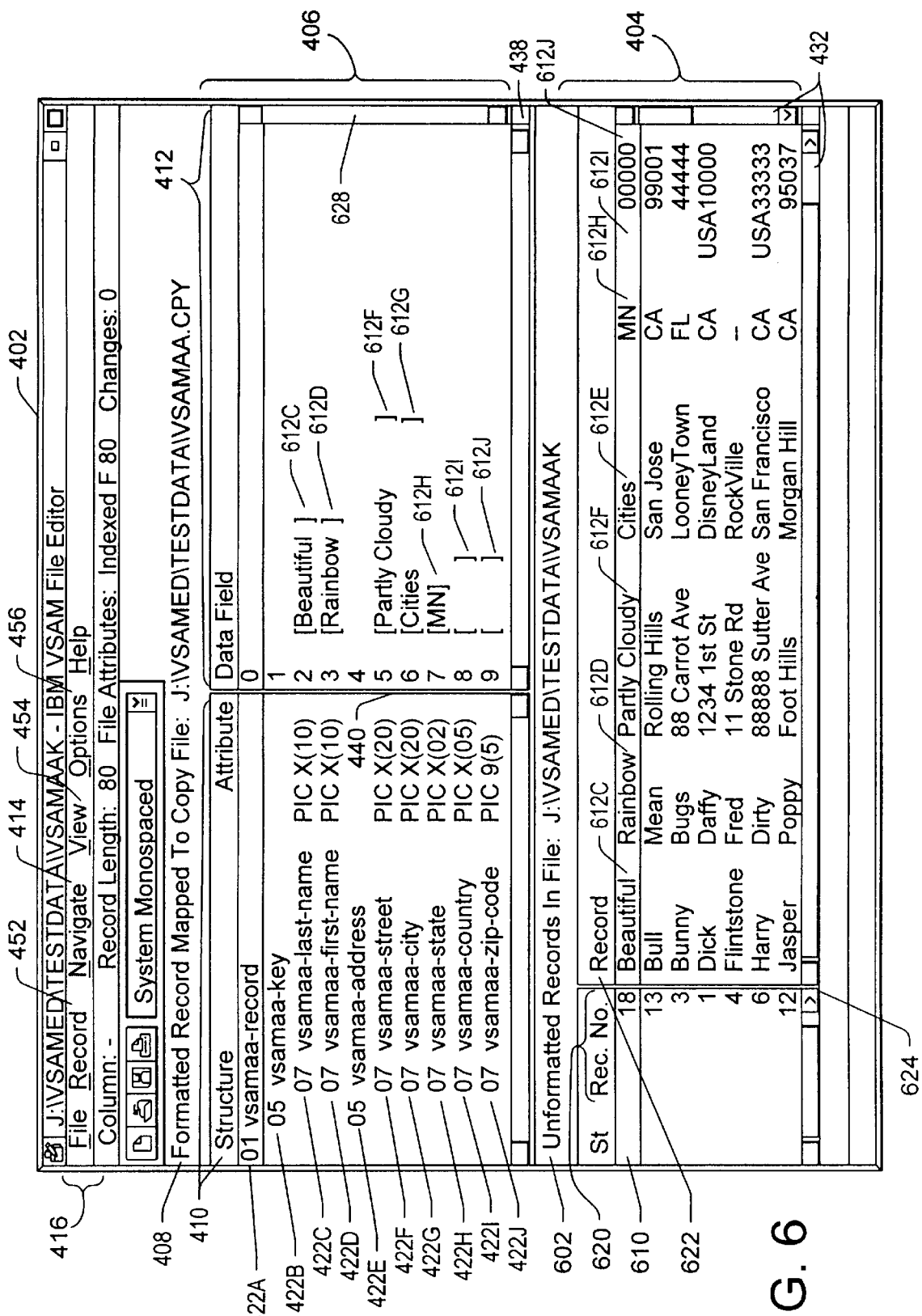
FIG. 6 is a diagram showing an illustrative embodiment of the data file browser/editor window after both the data file and the copy file have been opened.

Returning to FIG. 2, the user next opens a data file 152. This is depicted in block 204. The data file comprises at least one data record including at least one data field. FIGS. 5 and 6 provide illustrative embodiments of a user interface for opening the data file 152 and for the appearance of the data file browser/editor window 402 after opening the data file 152.

FIG. 5 is a diagram showing an illustrative embodiment of a data file selection window 502 that can be used to open a data file 152. The data file selection window 502 comprises a data file name entry box 504, in which the user may specify the desired data file 152. Alternatively, the user may search for the desired file using the data file directory drive selection box 508, the data file directory box 514, and the data file filename list box 512. File names displayed in the data file filename list box 512 are optionally filtered according to file type (typically indicated by the file extension) using the data file type entry box 506. A file selected in the filename list box 512 can be automatically entered into the data file filename entry box 504 by selecting the desired file by clicking on it or by other similar means.

In the example shown in FIG. 5, a data file 152 named "VSAMAAK" has been selected for opening. Once the name of the desired file appears in the file name entry box 504, the OK button 518 is depressed, and the selected data file 152 is opened. If the user selects the Cancel button 516, the data file selection window 502 disappears without the data file being opened. If the display of additional copy files or data files are desired, these can also be opened as described above.

If a copy file 150 has not been opened, the data in the data file 152 is interpreted directly from the data file 152 and displayed in the unformatted window portion of the data file browser/editor window 402, without extraneous processing to derive the structure from the copy file 150. If a copy file 150 has been opened, the information in the copy file 150 is used to format the data records of the data file 152 into data fields. This is depicted in block 206 of FIG. 2. After the data records are formatted, the data file browser/editor window 402 is again displayed. Logic representing this operation is depicted in block 208 of FIG. 2. Additional details regarding the retrieval and display of data are presented later in this disclosure.

As shown in block 210 of FIG. 2, the user can select one of several display modes for viewing the unformatted or formatted data, including ASCII or EBCDIC, and hexadecimal via the View pull-down menu 454. Further, the user may provide a selection of a data record in the unformatted window portion 404, and a formatted view of the selected data record will appear in the second formatted window sub-portion 412. Logic representing these operations is presented in blocks 212 and 214.

In the foregoing description, the file structure information and data were stored in separate files (namely, the copy file 150 and the data file 152, respectively). The present invention can also be embodied in a system wherein file structure information and data information are stored and retrieved in a single data file. In the foregoing, the copy file 150 was opened before the data file 152 was opened. The present invention may also be practiced by opening the data file 152 before opening the copy file 150. In this case, the data will be presented in the unformatted view until the copy file 150 is opened, since the copy file 150 contains the structure information necessary for presenting a formatted view of the data.

FIG. 6 is a diagram showing an illustrative embodiment of the data file browser/editor window 402 after both the data file 152 and the copy file 150 have been opened. An unformatted view of the data records read from the data file 152 are presented in the unformatted window portion 404 of the data file browser/editor 402. Record number column 620 shows a number if and only if the record has been saved or exists in the data file 152. Data records can be browsed in the unformatted window portion 404 by using the scroll bars 432 or the pull down Navigate menu 414 in the menu bar 416. Data records can also be selected as the current record by clicking on the desired record. The current record is indicated in the unformatted window portion 404 by delimiting the record. "Delimiting" a record refers to the placing of an identifying designation of the record or field on the display. This can be accomplished by highlighting, as shown in FIG. 6, or by similar means such as special characters.

In the illustrative example shown in FIG. 6, data record 610 has been selected. Selected data record 610 includes a first data field 612C with the data "Beautiful", a second data field 612D with the data "Rainbow - - - ", (where the symbol "–" denotes a space) a third data field 612F with the data "Partly Cloudy - - - " a fourth data field 612E with the data "Cities - - - " a fifth data field 612H with the data "MN", a sixth data field 612I with no data, and a seventh data field 612J with the data "00000."

Data records may also be browsed and selected via the keyboard 114 scroll buttons, or by selecting the Record pull down menu item 452 and selecting the Next, Previous, or Find menu items. The Find menu item opens a dialog box in which the user may enter text or wildcards, and searches for a data record meeting the entered parameter string requirements.

Upon selection of a data record 610, the data fields 612C–612J (collectively referred to hereinafter as 612) of that record are displayed in the second formatted window sub-portion 412, according to the information in the copy file 150. The field column so presented comprises read only fields (those associated with group items such as 422A, 422B, and 422E) and read-writeable fields (those associated with data items such as 422C, 422D, and 422F–422J). In the illustrated example, the data fields 612 are displayed in separate rows, adjacent to the data descriptors 422 in the copy file 150 associated with each data field. As the user selects an unformatted data record, that data record 610 is formatted according to the information in the copy file 150 and presented in the second formatted window sub-portion 412.

In one embodiment, the data file browser/editor window 402 can accept a selection of a data record and display the selected data record simultaneously in the unformatted data window portion 404 and the formatted data window portion 406. Further, as different data records are selected, the corresponding structure and fields associated with the selected data record can be displayed in the first formatted window sub-portion 410.

In another embodiment, the unformatted data window portion 404 and the formatted data window portion 406 are window "panes" whose size can be altered by selecting the boundary between the "panes" and moving the split bar 438 up and down. If desired, the pane boundary can be moved all the way to the top to hide the formatted window portion 406, or all the way to the bottom to hide the unformatted window portion 404. In addition, the first formatted window sub-portion 410 and the second formatted window sub-portion 412 are also resizable by selecting the boundary between these "panes" and moving the split bar 440 left and right. If desired, the pane boundary can be moved all the way to the left to hide the first formatted window portion 410, or all the way to the right to hide the second formatted window sub-portion 412.

In another embodiment, the records shown in the unformatted window may be records meeting one or more certain criteria, such as the most recent modification date, or data content. This functionality can be implemented with a search engine.

FIG. 6 also illustrates one of the benefits of the display provided by the data file browser/editor window 402. When illustrated in the unformatted data window 404, the user cannot readily identify the existence or characteristics of the sixth data field 612I since there is no indication where the fifth data field 612H ends. However, using the synchronized view provided by the data editor window 402, the formatted window portion 406 clearly indicates the definition of a five-character data field for the sixth field 612I.

Selecting Data Fields

Figure 7:
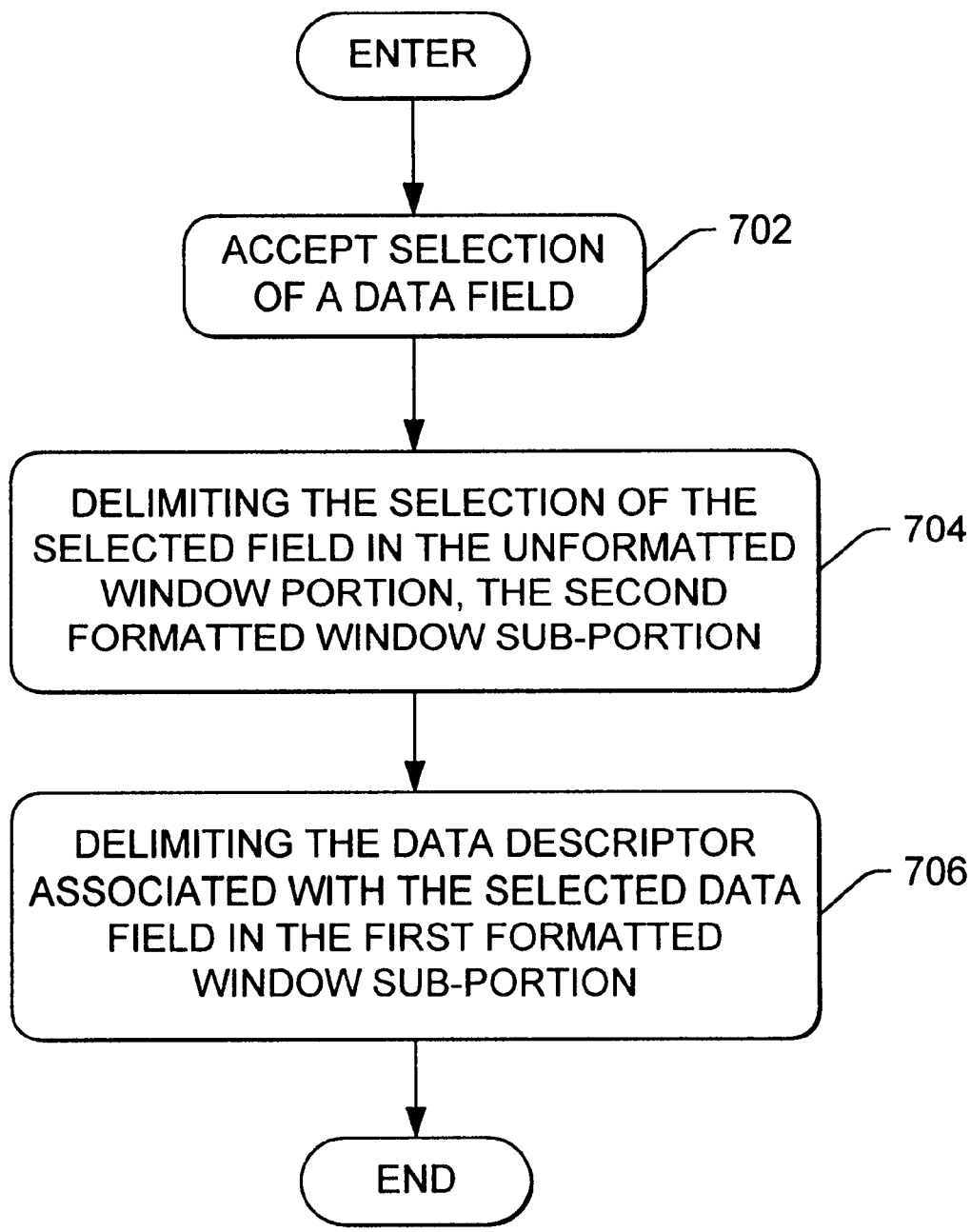
FIG. 7 is a flow chart presenting an exemplary process steps employed in accepting a data field selection and presenting the data field.

FIG. 7 is a flow chart presenting exemplary process steps employed in accepting a data field selection and presenting the data field. First, a data field selection is accepted 702. This can be accomplished by the methods described with respect to FIG. 8 below. As shown by the logic of block 704, the selected data field is delimited and synchronously updated in the unformatted data window portion 404 and the second formatted window sub-portion 704, and the data descriptor 422 associated with the selected data field is displayed in the first formatted window sub-portion 410. This is represented by the logic of block 706. The delimiting of the field may also include an indication of an attribute of the field. For example, the boundaries of the field can be indicated by highlighting the appropriate characters on the display or by using brackets.

The foregoing can be accomplished by selecting the record and field in the unformatted window portion (in which case, the associated data record and field information is updated and delimited in the formatted window portion), or by selecting the record and field in the formatted window portion (in which case, the associated data record and field in the unformatted window portion is updated and delimited).

Figure 8:
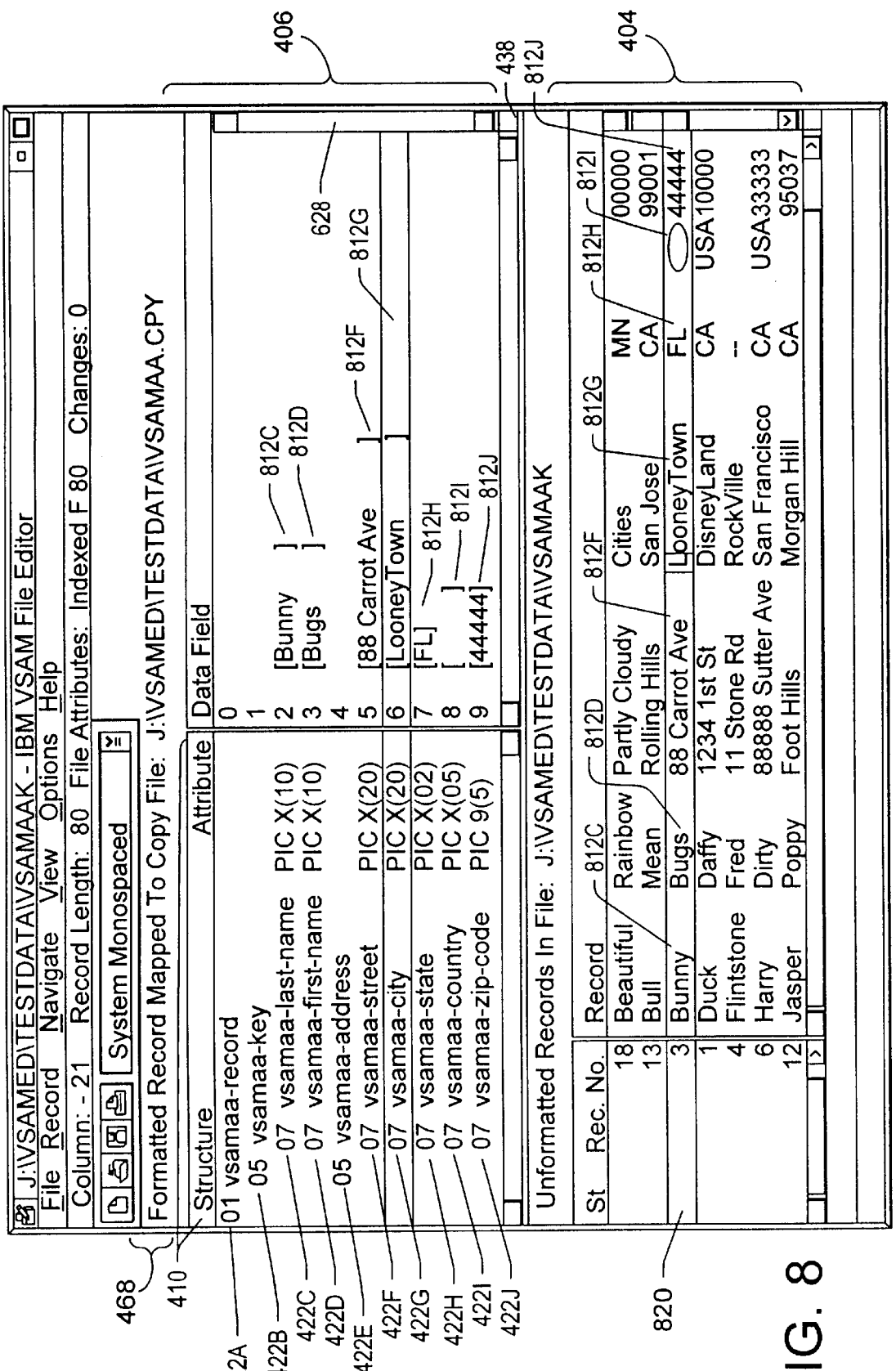
FIG. 8 is a diagram showing an illustrative embodiment of the data file browser/editor window after selecting the data field.

FIG. 8 is a diagram showing an illustrative embodiment of the data file browser/editor window 402 after selecting a data field. The formatted data window portion 406 can be used to scroll through the fields of a data record, and to select a data field as the current field. This can be accomplished via manipulation of the scroll bar 628 and clicking on a field in the second formatted window sub-portion 412 or a corresponding data descriptor 422 in the first formatted window sub-portion 410.

When the desired data field is selected, the data field (data field 812G in the example illustrated in FIG. 8) and associated data descriptor 422G are highlighted or otherwise delimited in the formatted data window portion 406.

In one embodiment of the present invention, the data fields 812 within a record are also delimited. This presents a semi-formatted view of the data record to the user in the unformatted data window portion 404. In the example shown in FIG. 8, the selected data field 812G within the record is indicated by highlighting and positioning the cursor at the first character in the selected data field 812. Alternatively, the entire selected data field 81 2G can be highlighted. Other ways of delimiting the selected data field are also possible. For example, the selected data fields 812 can be delimited by brackets ("[]") surrounding the data field, by painting the selected data fields 812 a different color than the other data fields in the data record, or by other means. In any case, the delimiting data fields 812 allows the user to see the boundaries of the data fields 812. This semi-formatted view is useful for experienced users, since it presents enough information to allow users to modify or edit the record (it allows the user to see where data fields begin and end), and yet takes less display real estate than the fully formatted view. It is envisioned that sophisticated users will generally edit data records from this view alone, resorting to the formatted view in the formatted data window portion 406 only when necessary. The formatted window portion 406 is synchronized with the unformatted window portion 404. Hence, corresponding data fields 812 and data descriptor 422 are presented in both the formatted data window portion and unformatted data window portion at the same time.

Modifying Data Records and Fields

Figure 9:
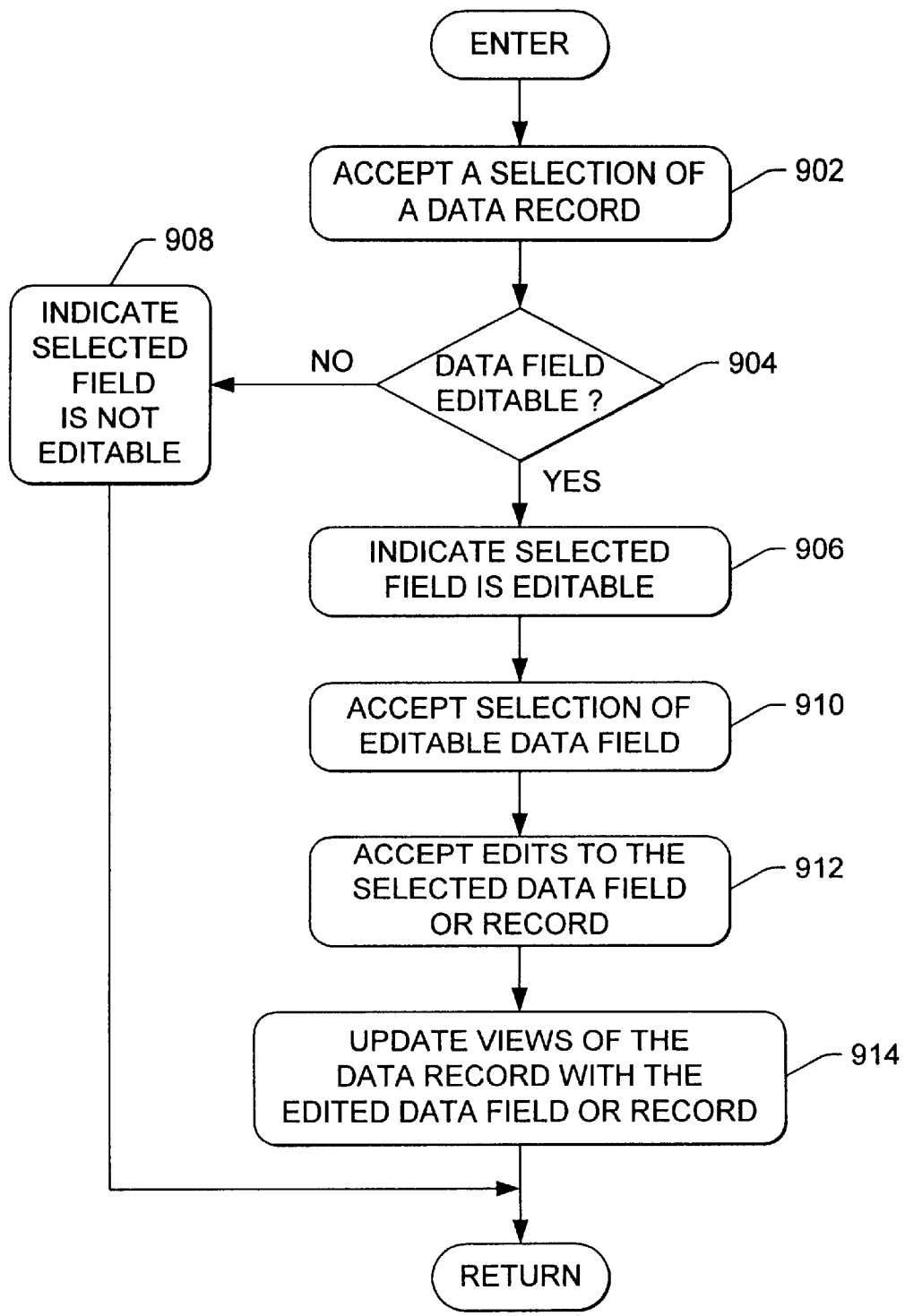
FIG. 9 is a flow chart showing exemplary steps performed in modifying data records and fields.

FIG. 9 is a flow chart showing exemplary steps performed in modifying data records and fields. Data records can be edited or modified by from the formatted data window portion 406 or the unformatted data window portion 404.

To modify a data record in the unformatted data window 404, the record to be edited is designated and opened in the unformatted data window 404. This is shown in block 902. This can be accomplished either by double clicking on the record, or by selecting the record with the mouse 116, and selecting the Record item 452 on the menu bar 416 selecting the Edit Record menu item. This opens an entry record 820 in the unformatted data window portion 404. The formatted data window portion 404 and the unformatted data window portion 406 then synchronously display the data fields of the selected data record. Editable and non-editable fields are identified 904, and each field's status is indicated in the view, as shown in blocks 906 and 908. By way of example, FIG. 8 shows a blocked cursor in data fields 812C, 812D, and 812F–812J showing that each of these data fields are editable. The information defining which fields in the data record are editable is obtained in the copy file 150. Editable data fields can also be indicated by placing brackets around the editable field, or by shading the editable field a different color than the unformatted data window portion 404 background. In one embodiment, the view also indicates the character length of each data record. This character length can also be represented, either by brackets around the data field (rather than the data), or shading. The shading technique maximizes use of the unformatted data window 404 space because it does not require additional characters.

Then, the user can either use the mouse 116 or the keyboard cursor control or tab key to position the cursor to select 912 an editable data field. Then, edits to the field such as additions, deletions, or modifications are entered with the keyboard 114, and accepted 912 by the computer 102.

After the edits are completed, the user can click the mouse outside the entry field, or select the keyboard 114 tab key to close the entry field and accept the data changes. After the data is entered, views of the data record are synchronously updated 914 where displayed in the window 402. In embodiments using the unformatted data window portion 404 and the formatted data window portion 406, both window portions are updated. This keeps the data synchronized in both window portions.

To modify a field of a data record using the formatted data window portion 406, the data record sought to be modified is displayed by the data file browser/editor window 402 in the formatted window data portion 406. The data field sought to be modified is selected in the formatted window portion 406. This can be accomplished by double clicking on the selected field or by selecting the Record menu 452 from the menu bar 416 and selecting the Edit Data Field menu item. The data file browser/editor then opens an entry field 812G containing the selected data field. In the illustrative example shown in FIG. 8, the data in the selected data field 812G is "LooneyTown." The keyboard 114 is then used to enter, modify and/or delete data in the field. The user can then indicate that the edit session is complete by clicking outside the entry field.

Deleting a Data Field

Data records can also be deleted using the data file browser/editor 402. This is accomplished by selecting the record to be deleted from the unformatted data window portion 404 of the data file browser/editor 402, and selecting the Record menu 452 of the menu bar 416, and selecting the Delete menu item. The data file editor will then delete the record. Alternatively, the data file editor may prompt the user to verify that the selected record should be deleted.

Adding a Data Record

Data records can also be added to the data file 152 using data file browser/editor window 402. This is accomplished by selecting the record above the location where a new record is to be inserted in the unformatted data window portion 404. Then, the user selects the Record menu 452, then selects the Insert New or Insert Duplicate menu item. The editor then creates a record immediately following the user selected record. If the command was an Insert New command, a new, empty record is created. If the command was an Insert Duplicate record, a duplicate of the selected record is created and inserted. The above-described methods for editing the new record can then be used to alter the new record as desired.

Creating a New Data File

A new data file 152 can also be created using the data file browser/editor window 402. This is accomplished by selecting the File menu 450 to display a menu of file choices, including a New menu item. This opens a new data file dialog box, which is presented on the display 122. Parameters for the new data file are then entered into entry fields presented in the dialog box, including a filename, file system, file organization (e.g. indexed, relative, etc.), record type (fixed length or variable length), and record length. A "create" button in the new data file dialog box is then selected to complete the process. The data file browser/editor window 402 then displays the newly created empty file. The data records are formatted in accordance with the current copy file.

Record IDs

Records are ordinarily stored in the data file 152, but may be brought from the data file into a cache 1208. A Record ID refers to a unique record, whether the record is stored in the data file 152 or the cache 1208, and can be thought of the "number" of a record in the data file 152 or cache 1208. The Record ID refers to one and only one record at a time. The Record ID has a unary ++ operator (i.e. it can be asked to "increment" itself, just as an integer number can be asked to increment itself). Hence, the Record ID can refer to the "next" record after the operator has been invoked.

The Record ID can be passed as a parameter to a function (e.g. getTextLines()). This function will use the Record ID to find the first record of interest in the data file 152 or cache 1208. Inside the getTextLines() function, a Record ID copy is passed to the file/cache subsystem. The required record is either in cache 1208 or read into the cache 1208 from the data file 152, and its pointer is returned. The Record ID copy can be incremented to find subsequent records of interest (e.g. to fill a display with 10 lines from 10 records). Meanwhile, the getTextLines() caller still has the original (unmodified) Record ID, identifying the record at the top of the display.

The records are ordered in the data file 152 and/or cache 1208. When the data file is an indexed VSAM file, the ++ operator steps through the records in order of the record keys.

A Record ID can be generated which refers to the beginning of the data file 152. A ++ operation causes the first record in the data file 152 to be identified. A Record ID can also be generated which refers to the end of the data file 152 (e.g. the "minus minus" or "--" operation causes the last record in the file to be identified.

Additional arithmetic operations can be performed using the Record ID. For example, the caller of the getTextLines() function may "page down" in the data file 152. This is accomplished by performing a "Record ID+=10" operation.

If too many records are requested (using any of the addition operators supported), the state of the Record ID changes to "end of file" and the file/cache subsystem returns NULL pointers. This conveniently causes the last display to be changed (e.g. five lines long instead of the usual ten).

Defining and Displaying Data Subsets

Figure 10:
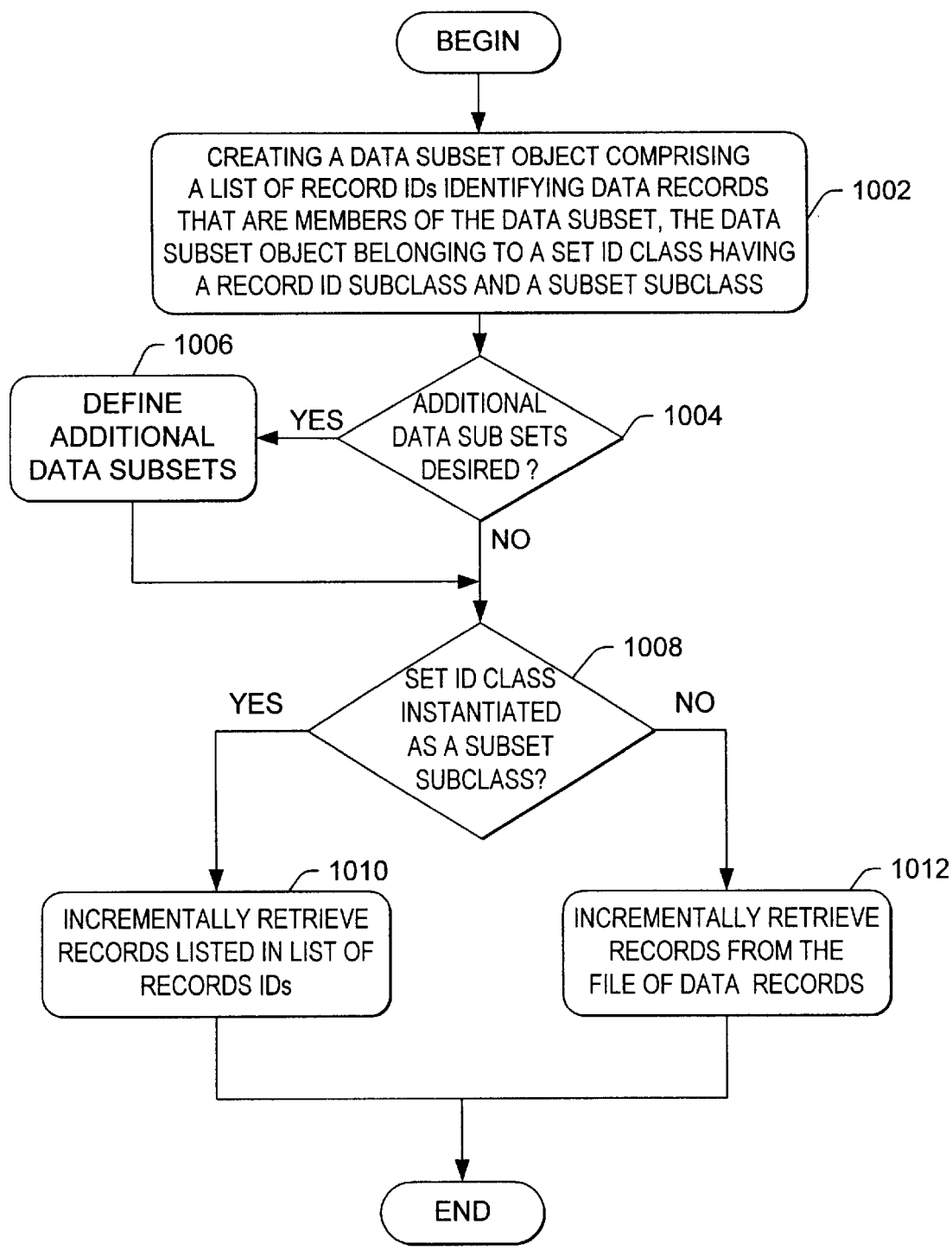
FIG. 10 is a flow chart depicting the operations used to create and display a subset of the data in a data file.

FIG. 10 is a flow chart depicting the operations used to create and display a subset of the data in the data file 152. First, as depicted in block 1002, a data subset object is created, and assigned a data subset Identification (ID). The data subset belongs to a SetID class. The SetID class specifics interfaces, such as a unary ++ operator. After it is invoked, the ++ operator updates references, directing them to the next record. The SetID class has a Record ID subclass and a subset subclass. Because subclasses must honor the interfaces they inherit from hierarchically superior classes (in this case, the SetID class), the Record ID and subset subclasses also provide the unary ++ operator.

The data subset object comprises a list of Record IDs identifying data records that are members of the subset. If additional data subsets are desired 1004, they may also be defined as depicted in blocks 1004 and 1006. Data records are then retrieved in accordance with how the SetID class has been instantiated. If the SetID class is instantiated as a subset subclass, data records listed in the Record ID list are incrementally retrieved from the subset. In one embodiment, this is implemented by performing a ++ operation on the subset, which steps to the next Record ID in its list. If the SetID class is instantiated as a Record ID subclass, data records are incrementally retrieved from the file of data records. In one embodiment, this is implemented by performing a ++ operation on a Record ID, which steps to the next record in the data file. This is implemented by the logic depicted in blocks 1008–1012, and is further summarized in Table I below:

TABLE I

| Array Index | Pointer Type | Instantiated Class | ++ Operation |
|---|---|---|---|
| 0 | SetID | Record ID | steps to next record in data file |
| 1 | SetID | Subset | steps to next record in subset 1 |
| 2 | SetID | Subset | steps to next record in subset 2 |
| 3 | SetID | Subset | steps to next record in subset 3 |
| 4 | SetID | Subset | steps to next record in subset 4 |

Figure 11:
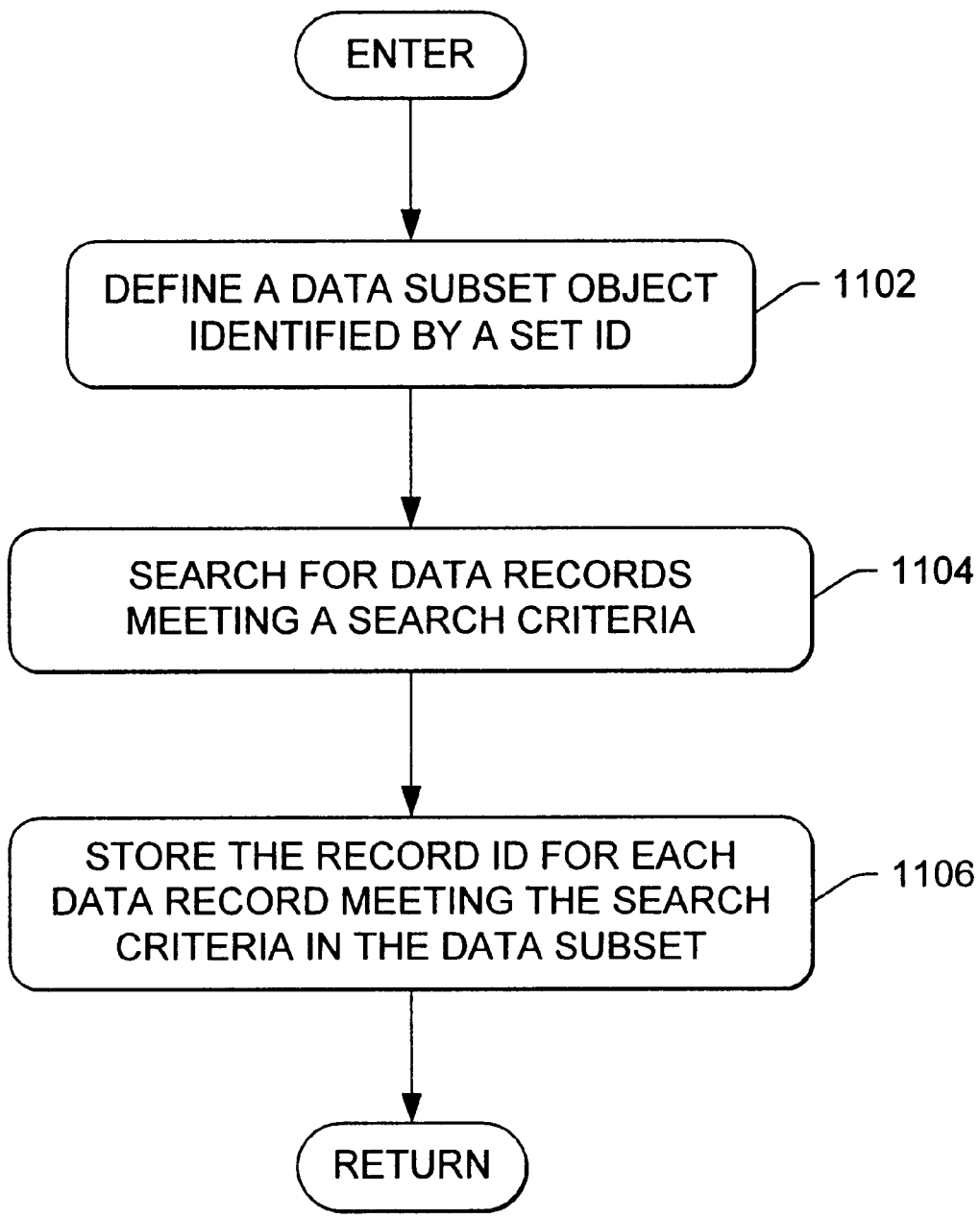
FIG. 11 is a flow chart illustrating the operations performed in the creation of a data subset object.
Figure 12:
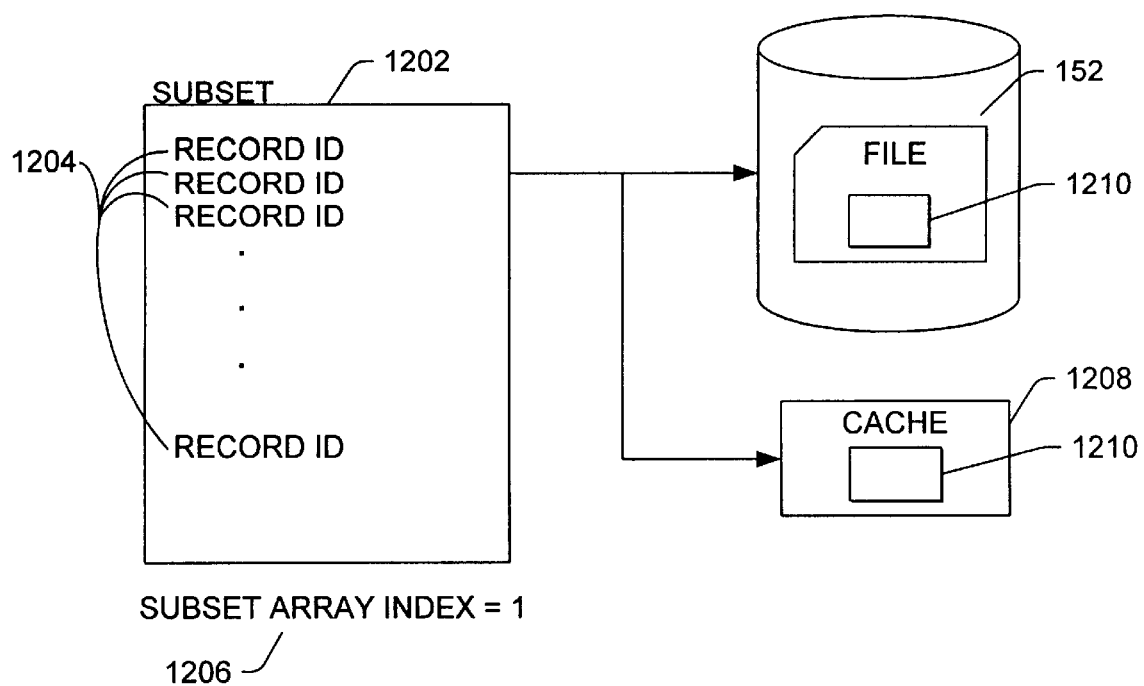
FIG. 12 is a diagram illustrating the creation of a data subset object.

FIGS. 11 and 12 are diagrams illustrating the creation of a data subset object. First, a data subset object 1202 identified by a set ID 1206 is defined. This is illustrated in block 1102. Then, the data records 1210 in the data file 152 and cache 1208 are searched (using a "findAll()" or similar operation) to find data records 1210 meeting a search criteria. This is illustrated in block 1104. Then, as shown in block 1106, the data Record ID 1204 for each data record meeting the search criteria (and hence, in the defined data subset) is stored in the data subset object 1202 and associated with a subset array index 1206.

The data editor also stores data record metadata, including the data record status. This metadata can also be included in the search criteria. For example, the search criteria 1402 could be a command such as "&dup='D'" to search all records with duplicate keys. This could be useful for VSAM indexed files, because the key field name and value could be logically ORed in the Boolean search criteria to create a subset of any keys with a collision problem needing attention. The search criteria 1402 could also be a command such as "&mod='M'." This permits finding all modified records and checking them before committing them by saving them to a data file 152.

Figure 13:
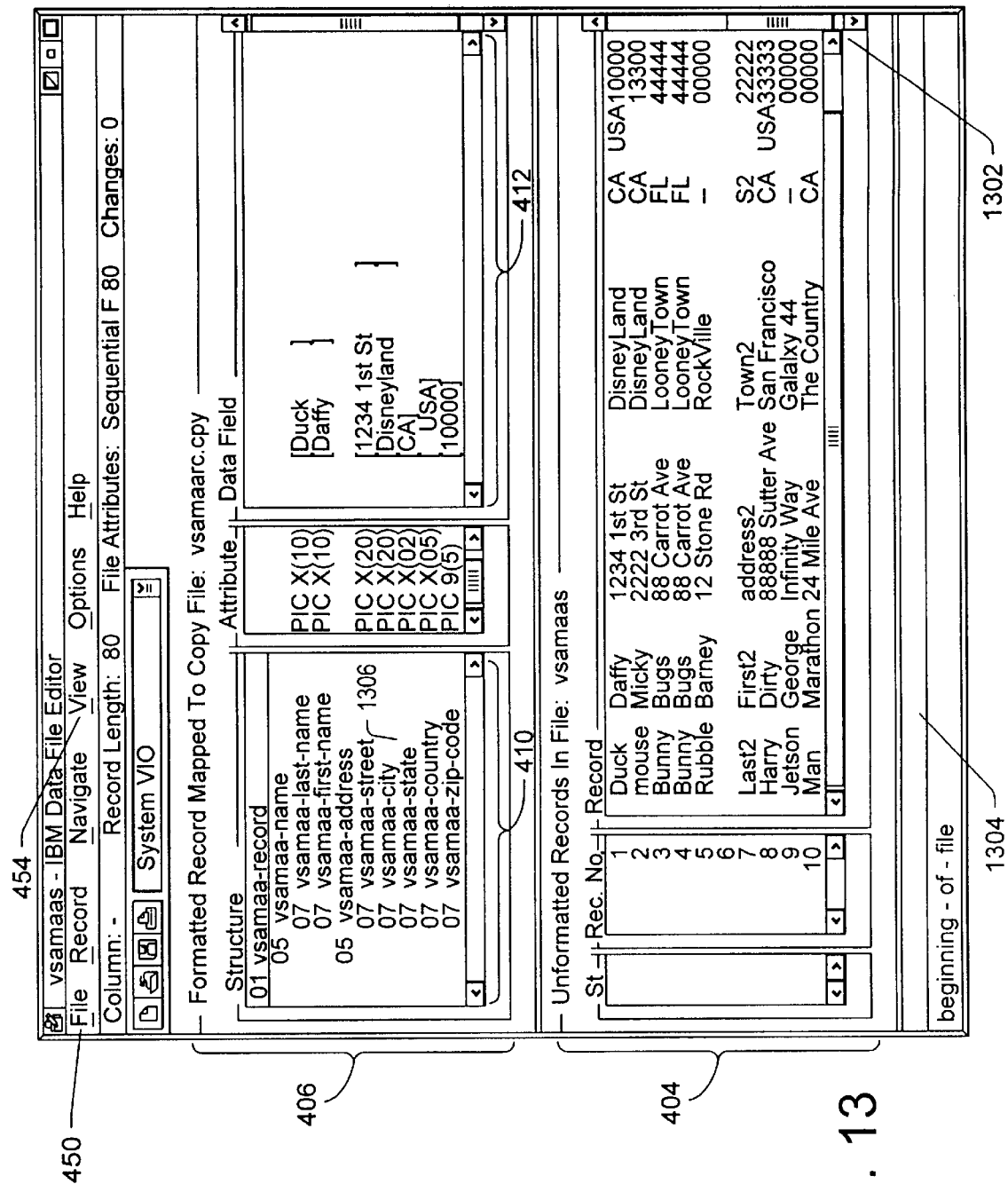
FIG. 13 is a diagram showing an exemplary user interface for creating a data subset object.

FIG. 13 is a diagram showing an exemplary user interface for creating a data subset object 1202. Here, the user has opened a data file 152 and a copy file 150, and the display editor has displayed the data records in the formatted 406 and the unformatted 404 data window portions. Unformatted data window portion 404 displays a portion of the data records to be searched. Field names 1306 are displayed in the formatted window first portion 410. Data records not currently visible in the unformatted data window portion 404 can be viewed by using the scroll bar 1302. Search commands are entered into the command line 1304 to define search criteria and other relevant information.

Figure 14:
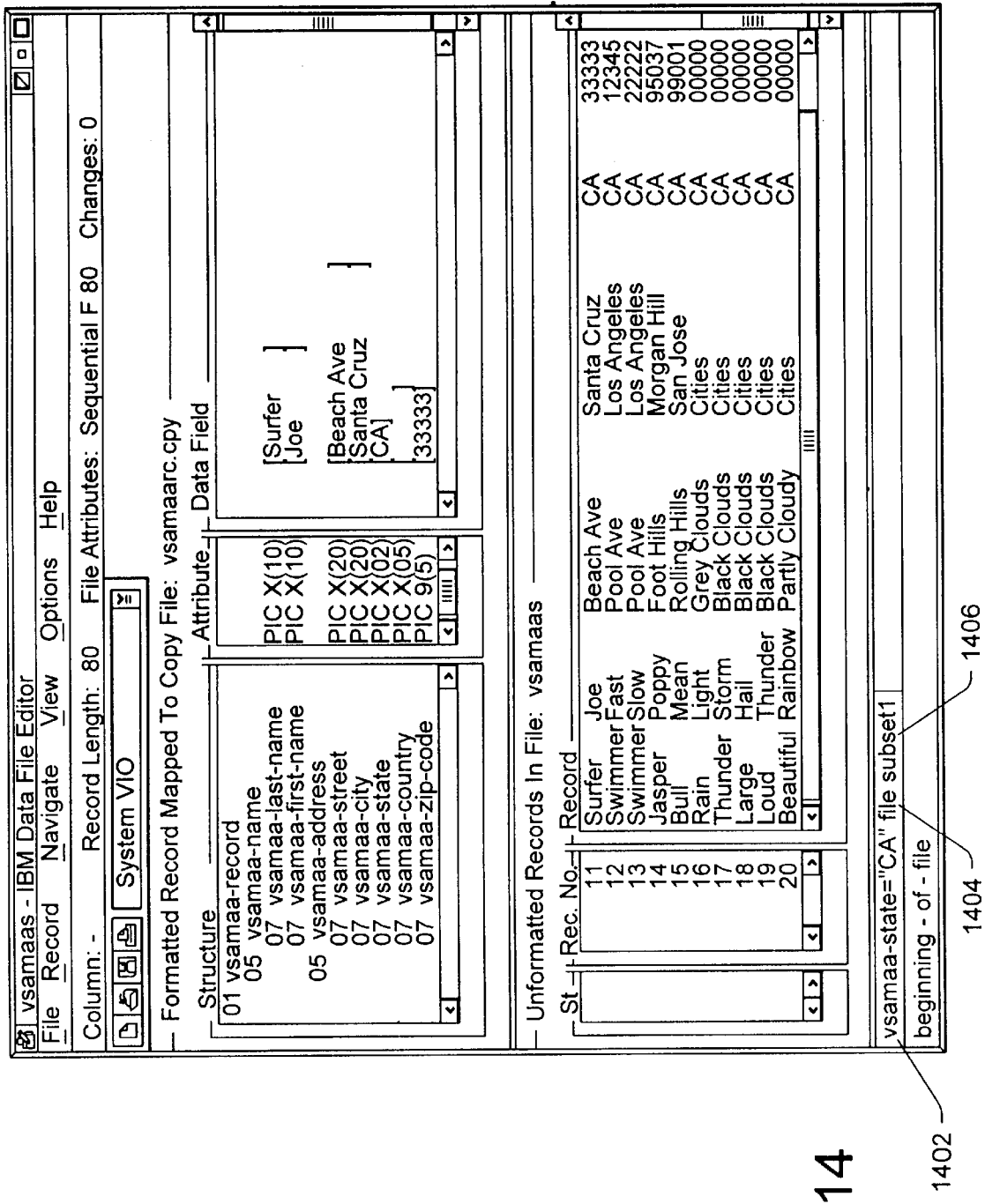
FIG. 14 is a diagram showing the entry of a search criteria for creating a data subset object.

FIG. 14 is a diagram showing the entry of a search criteria for creating the data subset object. The command line 1304 allows the user to enter a search criteria 1402, and a search source 1404 and a data subset ID 1406 operand. In this illustration, the user has asked for a search to find all records in filename "file" for which the value of the variable "vsamaa-state" is "CA", and has indicated that the results of the search be stored in a data subset object named "subset 1." The search criteria 1402 may also comprise a search string implementing Boolean logic.

Figure 15:
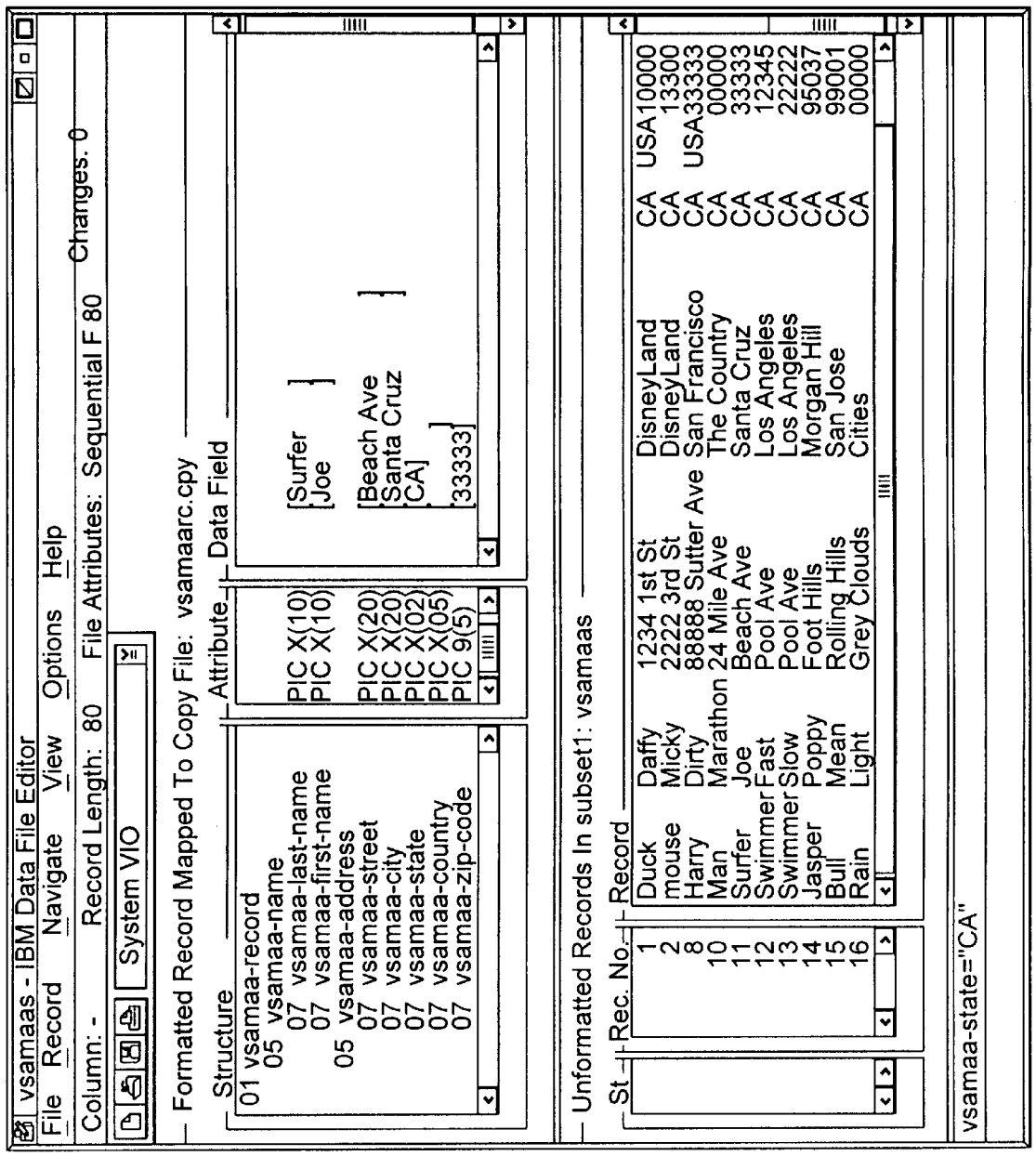
FIG. 15 is a diagram showing the results of the search criteria described in FIG. 14.

FIG. 15 is a diagram showing the results of the search criteria described in FIG. 14. Note that all data records in the file for which the "vsamaa-state" variable is equal to "CA."

Figure 16:
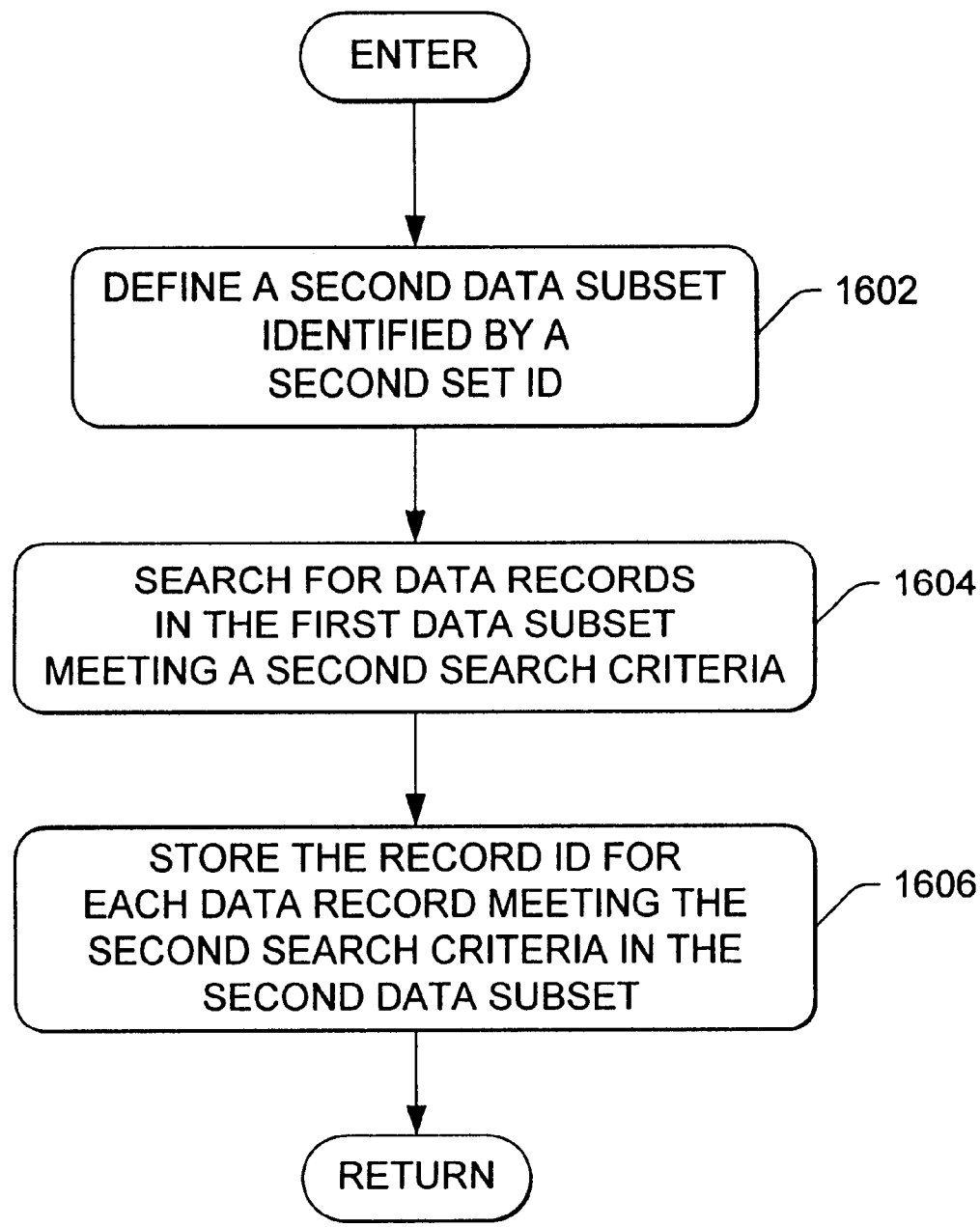
FIG. 16 is a flow chart illustrating an exemplary embodiment of the operations used to define additional subsets.

FIG. 16 is a flow chart illustrating an exemplary embodiment of the operations used to define additional data subsets. First, a second data subset is defined and associated with a second set ID, as depicted in block 1602. Then, the data records are searched to find data records meeting a second search criteria. This is illustrated in block 1604. Finally, the Record ID for each data record meeting the second search criteria is stored in the second data subset object.

The foregoing can be accomplished with a "findAll()" command or similar operation as previously described. In one embodiment, the "findAll()" command accepts two SetID parameters. The first SetID parameter specifies the source (file or subset) for the search, and the second SetID parameter specifies the destination to record the matches found by the search. This allows searching through the data subsets.

In the illustrated example, the second search criteria has been applied to the result of the application of the first search criteria, subset 1. Hence, the subset defined from the foregoing operations will be those data records which satisfy both the first and the second search criteria, and the second data subset has been created from the first data subset.

Figure 17:
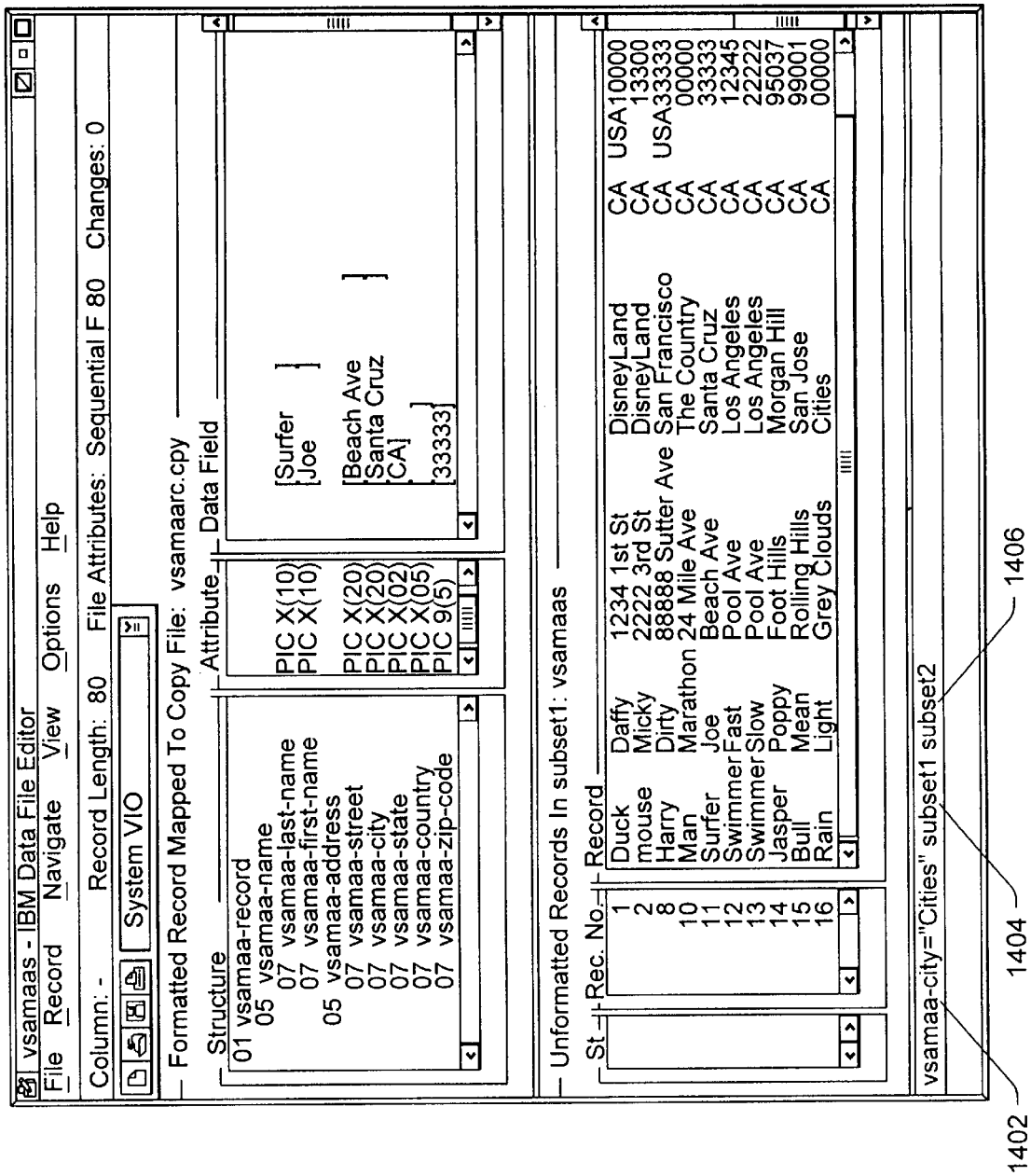
FIG. 17 is a diagram illustrating an exemplary user interface for entering the second search criteria.

FIG. 17 is a diagram illustrating an exemplary user interface for entering the second search criteria. In the illustrated example, after the application of the first search criteria (resulting the first data subset), the user has entered character string into the command line 1304 indicating that the search criteria is to find records with "cities" values for the "vsamaa-city" variable within the search source "subset1" and store the Record IDs for the data records matching this criteria into a data subset object known as "subset2." In an alternative embodiment, a third operand (in addition to the search source 1404 and data subset ID 1406) such as "[append]" can be used to specify adding to a subset rather than starting a new one.

Figure 18:
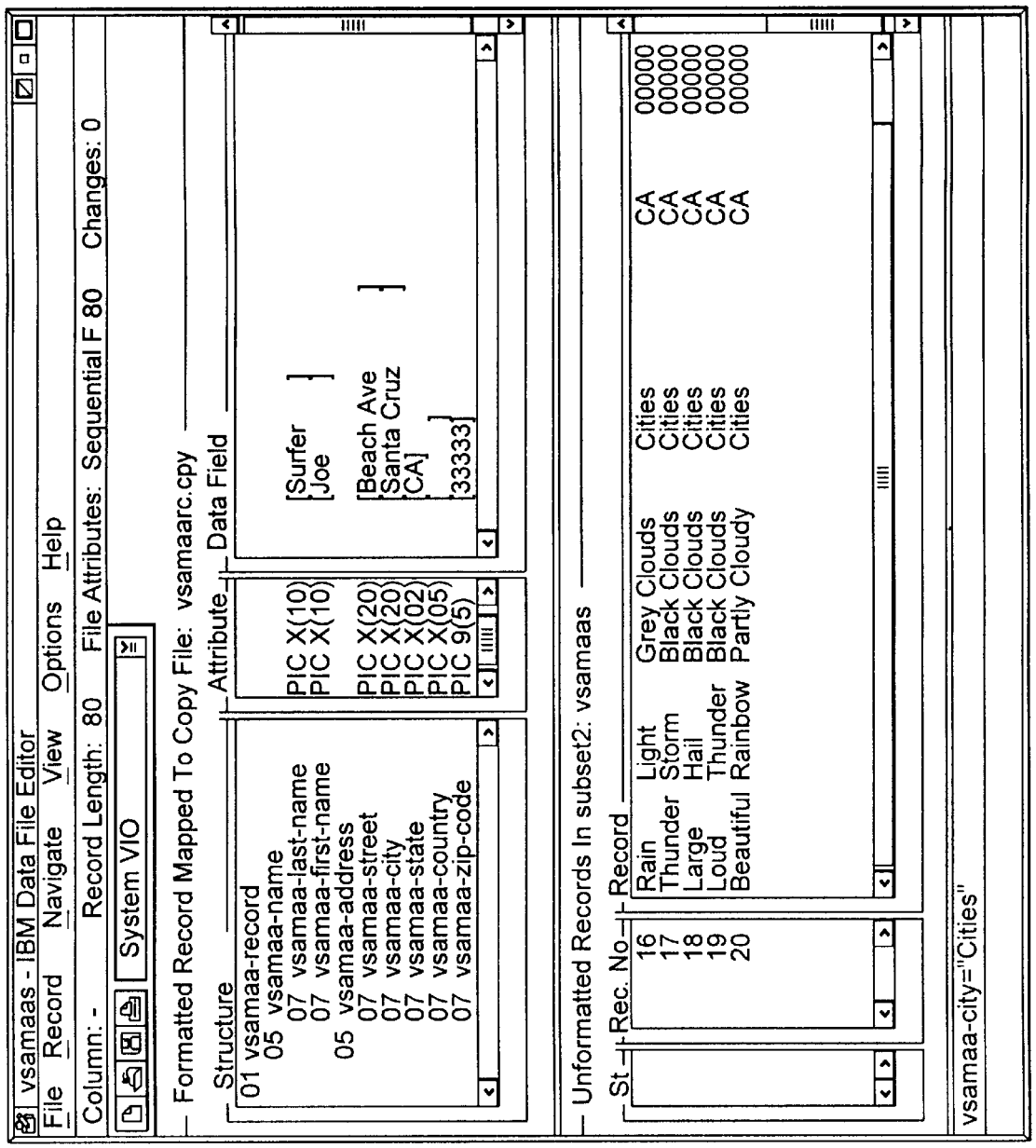
FIG. 18 is a diagram showing the results of the application of the second search criteria to the first data subset.

FIG. 18 is a diagram showing the results of the application of the second search criteria to the first data subset. Note that the records shown in the unformatted window portion 404 are those meeting both the first and the second search criteria.

In addition or as an alternative to the searching technique described above data subsets can be defined by other methods. For example, a data subset can be defined directly by selecting and designating data records using a GUI interface in the unformatted data window portion 404. Similarly, the searching technique described above can be used, and data records can be eliminated from the resulting data subset by selection and designation as well.

Displaying Data Subsets

Figure 19:
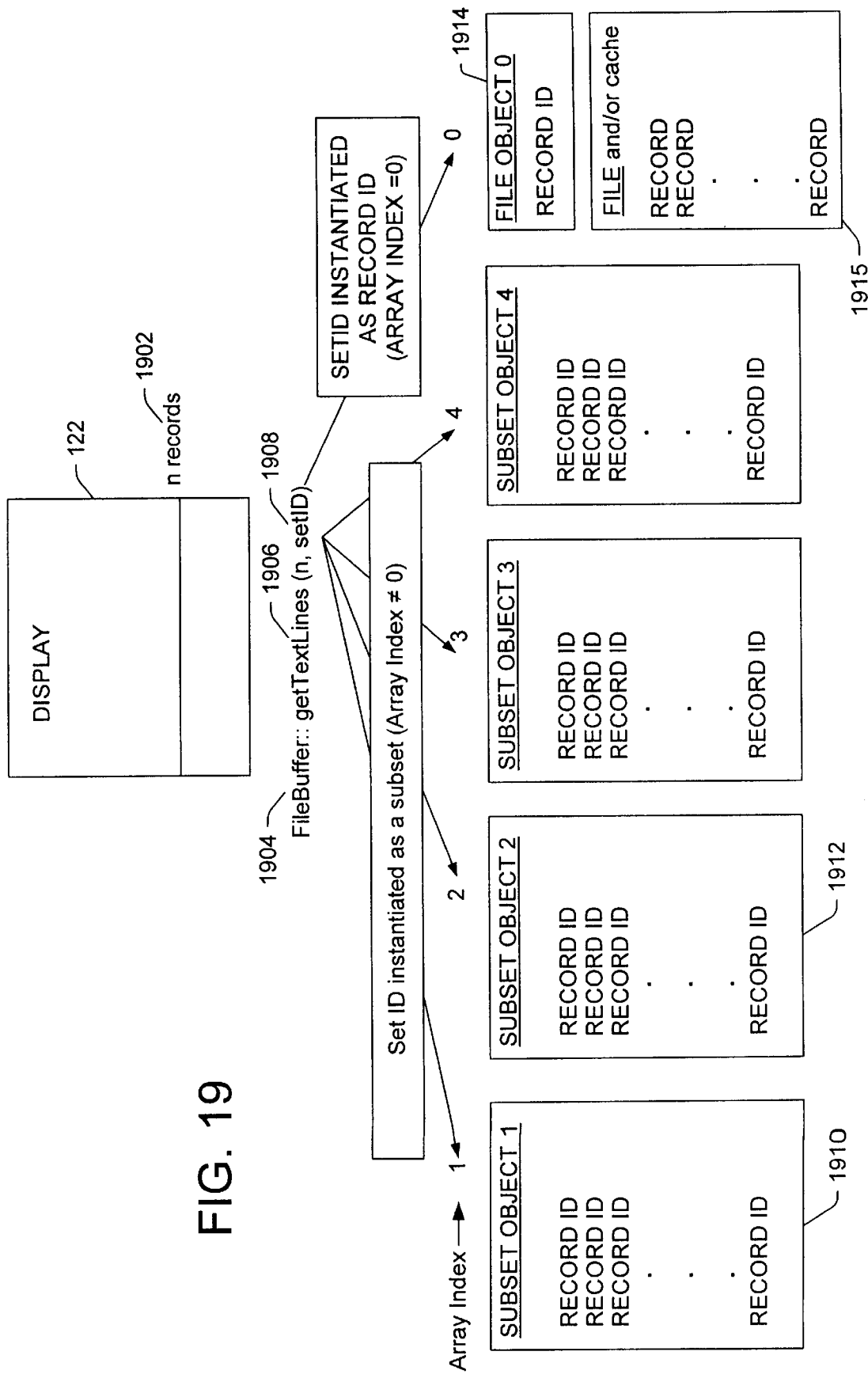
FIG. 19 is a diagram illustrating the process of displaying data subsets.

FIG. 19 illustrates the process of displaying data subsets. After the data subset object is created and the data records have been searched by a "findAll()" or similar operation, data records in the cache 1208 or data file 152 are read, one at a time, by a command 1904 to a FileBuffer. Progress through the data file 152 or cache 1208 is remembered in a Record ID. Hits (data records satisfying the search criteria) are recorded in a Record ID list kept by the data subset object. When a display limit 1902 of Record IDs (depicted as "in" in FIG. 19) have been accumulated (corresponding to the display real estate available to display the records), the "findAll()" operation returns, allowing the display of the records found thus far. At the same time, a separate thread is spawned to continue the "findAll()" operations in the same direction through the data file 152 or cache 1208. Any hits are added to the Record ID list and are available for subsequent displays. If the number of Record IDs in memory exceeds a threshold, a second algorithm is invoked, and the data file 152 or cache 1208 is researched using the stored search criteria to rebuild the Record IDs as needed to display the data records as required.

A getTextLines() or similar operation 1906 is used to display the data records matching the selected search criteria. The getTextLines() operation accepts a source parameter 1908 (e.g. the SetID) which knows the first record to be displayed and an increment (n) indicating how many subsequent records will be displayed. The SetID 1908 points to an instance where the Record ID list describing the data records to be displayed will be retrieved. If the SetID is instantiated as a subset (which occurs when the array index is≠0) the displayed data records will be those with Record IDs listed in the data subset object. If the SetID is instantiated as a Record ID (which occurs when the array index=0) the displayed data records will be read directly from the file. In the example illustrated in FIG. 19, a SetID indexed by a "1" indicates that the displayed data records will be those which are listed in the data set object 1910, whereas if the set ID indexed to a "2", the displayed data records will be those which are listed in the data set object 1912. When the set ID is set to "0", the display lines are built from the file object 1914 associated with data file and/or cache 152 and not from a data subset. Both the subset and Record ID subclasses have a ++ operation. This allows them to step to the next record in the subset or file until n hits have been accumulated. data file 152.

Selecting Subsets for Viewing

Figure 20:
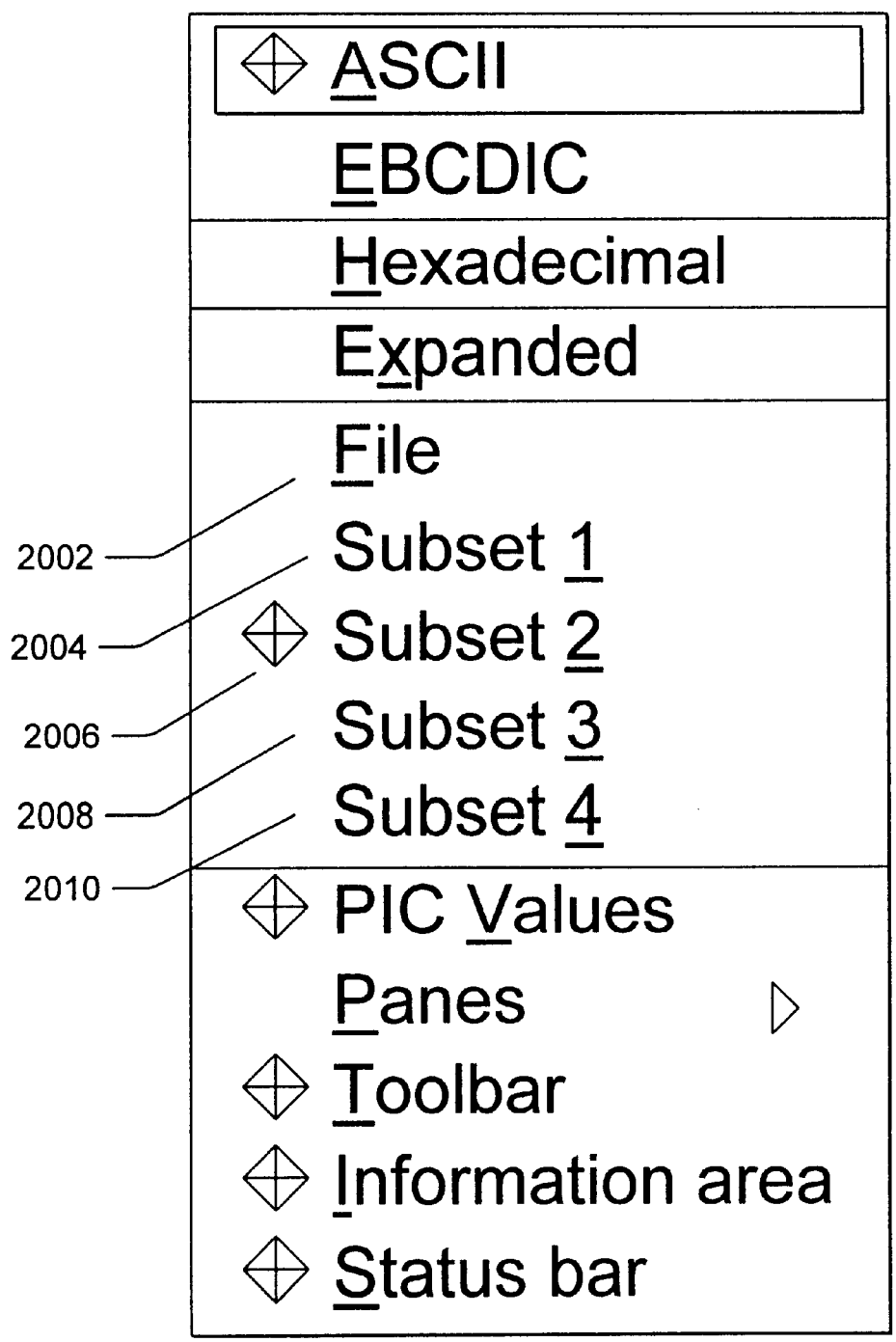
FIG. 20 shows an exemplary embodiment of the user interface by which the user may select which data subset or data file are presented in the data file editor.

FIG. 20 shows an exemplary embodiment of the user interface by which the user may select which data subsets are presented in the data file editor. In the illustrated embodiment, the user selects the entire file by selecting the view pull down 454. The user can then select the file option 2002 to make all of the data records in the data file 152 current and viewable in the unformatted data window portion 404. Alternatively, the user can select the subset 1 option 2004 to make subset 1 the current subset, and to view all records in subset 1 in the unformatted data window portion 404. Subset 2 option 2006 is marked with an icon to show that the data records in subset 2 are currently displayed in the unformatted window portion 404. Subset 3 and 4 options 2008 and 2010 are unavailable, as indicated by the gray lettering.

Once created and displayed, the current subset's "data records," i.e. data file records identified by Record IDs in the current subset, can be modified using the data file editor's ability to scroll, find, and edit, exactly as it would if the records were in the data file 152. A record in a subset can also be deleted, which deletes the record from the data file 152 when the data file 152 is saved. Selected records can be added to or subtracted from the subset as desired.

Saving Subsets

Figure 21:
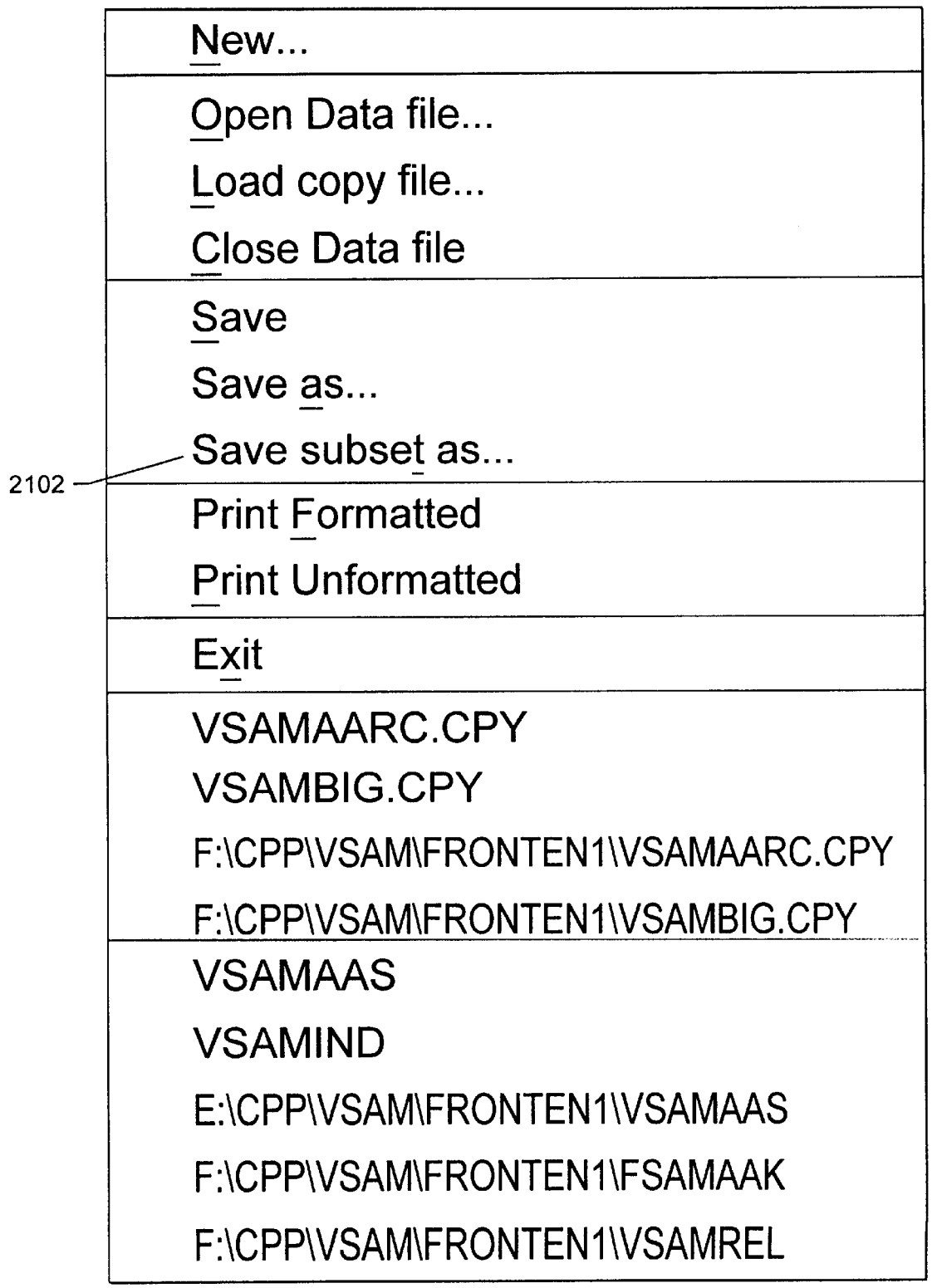
FIG. 21 is a diagram showing a drop down menu item in a user interface for saving a data subset as a file.
Figure 22:
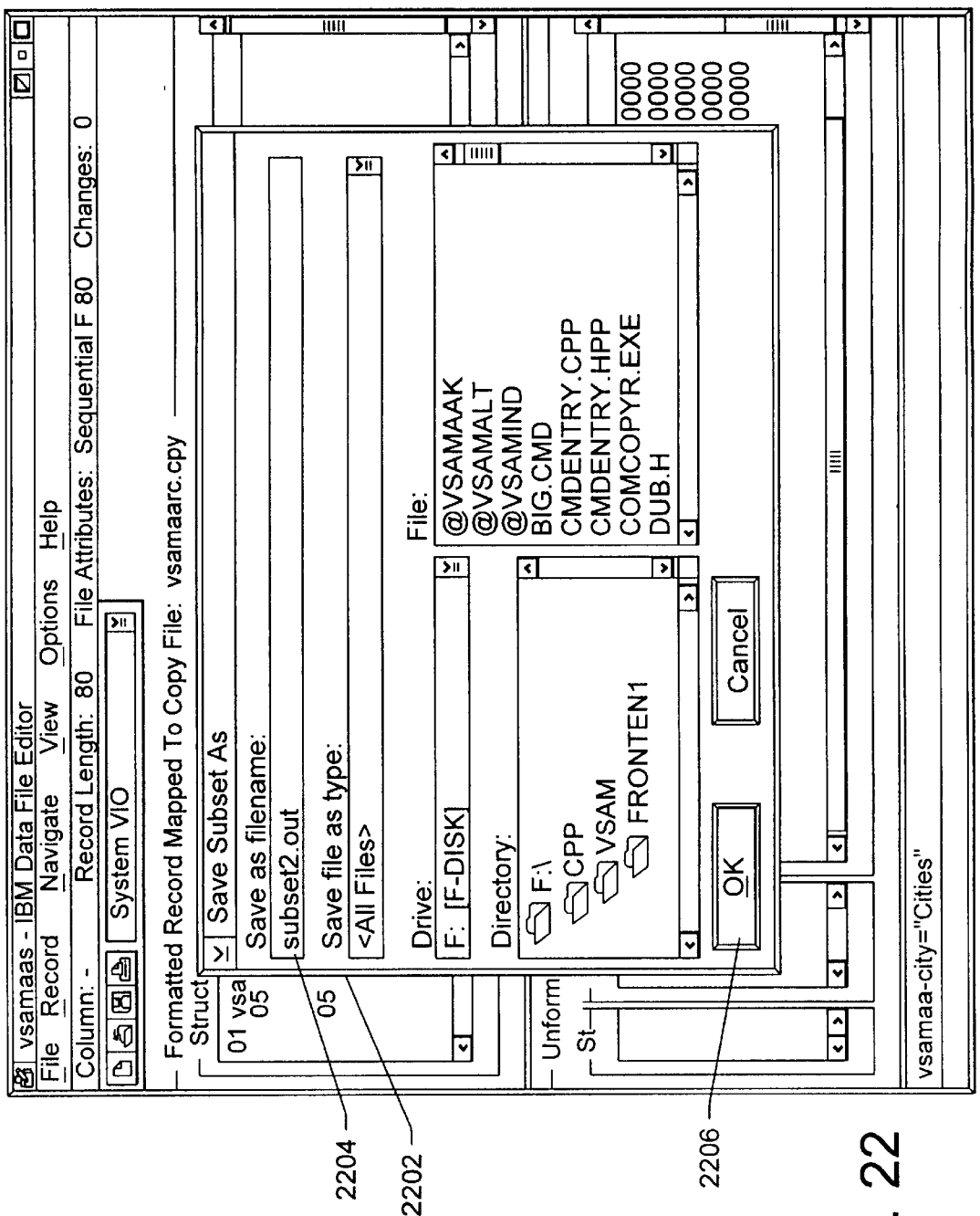
FIG. 22 is a diagram showing a dialog box used to save a data subset.

FIGS. 21 and 22 are diagrams showing a user interface for saving data subsets. FIG. 21 shows a drop down menu that is presented to the user when the file menu 450 is selected. The user can elect to save the current subset by selecting the "Save subset as . . . " option 2102. When this option is selected, a "save subset as file", the dialog box 2202 shown in FIG. 22 is presented. The user can then enter a name in the filename entry field 2204, and select the OK button 2206 to save the current data subset.

Performing Set Operations with Data Subsets

Figure 23:
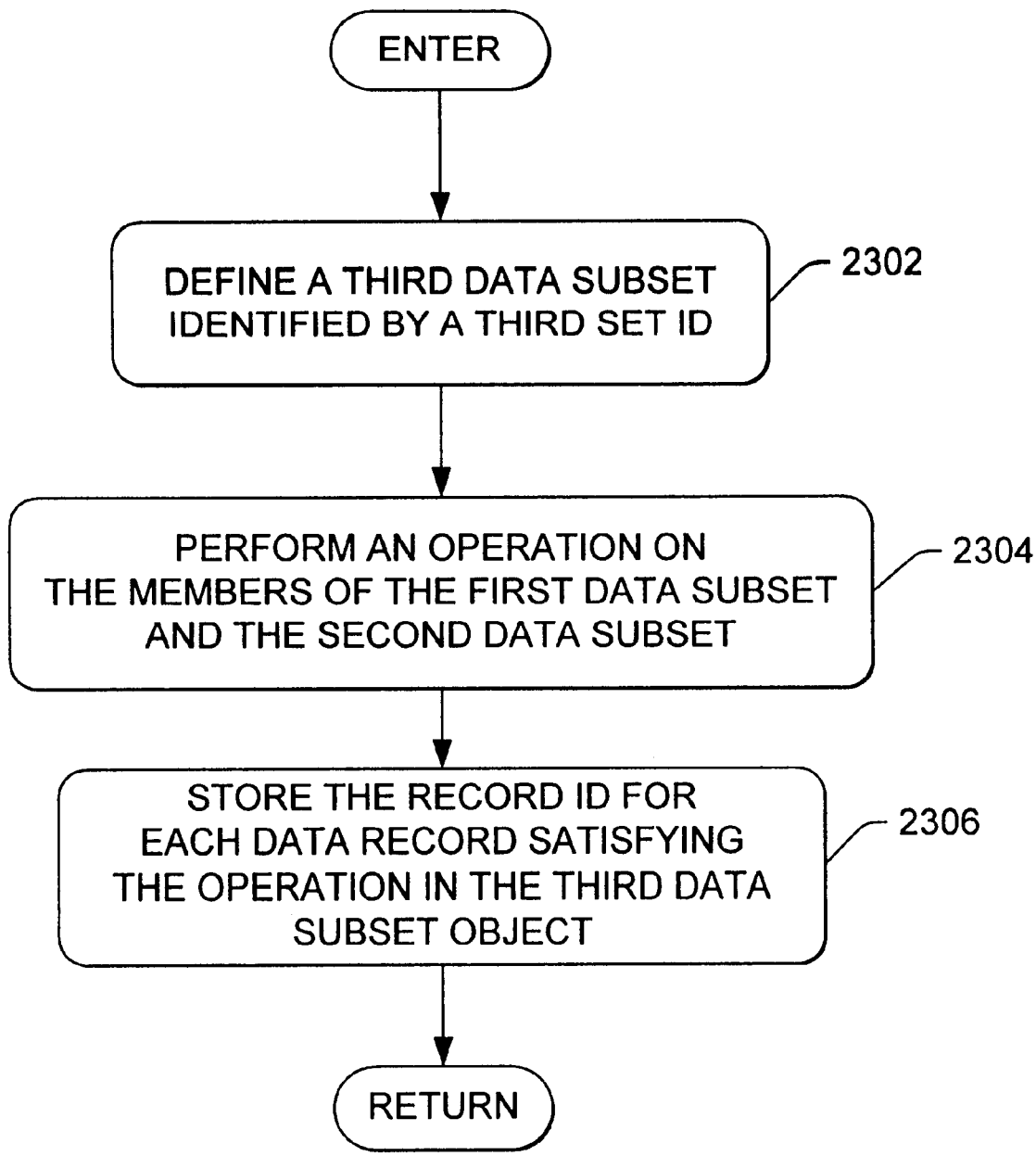
FIG. 23 is a flow chart illustrating the process of defining a third data subset by set operations from a first and a second data subset.

FIG. 23 is a flow chart depicting one embodiment of the steps used to apply set operations to two existing data subsets to define a third data subset. First, as depicted in block 2302, a third data subset is defined and associated with a third set ID. Then, an operation is performed on the members of the first data subset and the second data subset, and the Record ID for each data record satisfying the operation is stored in the third data subset object. This is depicted in blocks 2304 and 2306.

FIG. 24 presents an exemplary illustration of subset operations. These subset operations include an ADD operation, in which all data records from the first input data subset and the second input data subset combined to form a output data subset; an EXCLUSIVE OR operation, in which the output data subset comprises the members which are in the first input data subset or the second input data subset, but not both subsets; and an OR operation, in which the output data subset comprises members of both the first input data subset and the second input data subset, but without duplicate entries. Other set operations can be defined using combinations of the foregoing, or by separate logical definition. Each set operation can be applied against the entire record or some portion of the record, as desired. Also, a subset can be formed from two different data files. In one embodiment, a dialog box is presented to the user, allowing the user to specify two input subset instances, the third data subset (which will be an output subset instance), and an operation for defining the third data subset.

Conclusion

This concludes the description of the preferred embodiments of the present invention. In summary, the present invention describes a method, apparatus, and article of manufacture for designing and displaying data subsets formed from a file of data records.

Data subsets are defined, and a data subset object is created that includes a list of Record IDs identifying data records that are members of the defined data subset. The data subset object belongs to a set ID class having a Record ID subclass and a subset subclass. If the set ID class is instantiated as a subset subclass, the data records listed in the Record ID list are retrieved incrementally, according to the Record ID list. If the set ID class is instantiated as a Record ID subclass, data records are incrementally retrieved from the data file. The article of manufacture comprises a data storage device tangibly embodying instructions to perform the method steps described above.

The apparatus comprises a means for creating a data subset object having a list of Record IDs identifying data records that are members of the data subset, and a means for incrementally retrieving the data records listed in the list of Record IDs. The data subset object belongs to a set ID class having a Record ID subclass and a subset subclass. The data records listed in the Record ID list are incrementally retrieved when the set ID class is instantiated as a subset subclass and incrementally retrieved records from the file of data records when the set ID class is instantiated as a Record ID subclass.

The foregoing can be used to define multiple data subsets and to perform operations on that those subsets to define additional data subsets. Additional data subsets can be defied with the use of a second search or find command describing a second search criteria, or may be defined by applying a search or find command specifying a search criteria to data subsets already created. Once multiple data subsets have been defined, set relationships between the subsets can be used to define additional data subsets. Further, while the foregoing has been described with respect to creating and manipulating subsets formed from a single file, the same principles can be applied to define two set IDs as 2 Record IDs pertaining to two files. That is, the Record IDs and source IDs described herein could belong to two or more different files. This would allow performing logical functions such as EXCLUSIVE ORs to compare the records in two different files or to define subsets which include records from two different files.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of defining and displaying data subsets formed from a file of data records, comprising the steps of:

creating a data subset object comprising a list of record IDs identifying data records that are members of the data subset, the data subset object belonging to a set ID class having a record ID subclass and a subset subclass; and incrementally retrieving the data records listed in the list of record IDs when the set ID class is instantiated as a subset subclass.

2. The method of claim 1, wherein the step of defining a data subset object comprises the steps of:

searching for data records in the file meeting a search criteria; and storing the record ID for each data record meeting the search criteria in the data subset object.

3. The method of claim 1, further comprising the step of incrementally retrieving the data records from the file of data records when the set ID class is instantiated as a record ID subclass.

4. The method of claim 3, wherein the set ID class is instantiated in accordance with an array index.

5. The method of claim 4, wherein the set ID class is instantiated to the record ID subclass when the array index is zero.

6. The method of claim 3, further comprising the step of creating a second data subset object comprising a list of record IDs identifying data records that are members of the second data subset, the second data subset object belonging to the set ID class.

7. The method of claim 6, wherein the data records are incrementally retrieved from the first data subset object and the second data subset object according to the array index.

8. The method of claim 6, wherein the step of creating a second data subset object comprises the steps of:

searching for data records in the first data subset object meeting a second search criteria; and storing the record ID for each data record meeting the second search criteria in the second data subset object.

9. The method of claim 6, further comprising the step of creating a third data subset object comprising a list of record IDs identifying data records that are members of the third data subset, the third data subset object belonging to the set ID class.

10. The method of claim 9, wherein the step of creating a third data subset comprises the steps of performing an operation on the members of the first data subset and the members of the second data subset, and storing a list of record IDs for the members satisfying the operation in the third data subset object.

11. The method of claim 10, wherein the operation is selected from the group comprising:

an ADD operation, wherein members satisfying the ADD operation include all members of the first data subset and the second data subset;

an EXCLUSIVE OR operation, wherein members satisfying the EXCLUSIVE OR operation include all members which are a member of the first data subset or the second data subset, but not a member of the first data subset and the second data subset; and an OR operation, wherein the members satisfying the OR operation are members of the first data subset and the second data subset without duplicate members.

12. An apparatus for defining and displaying data subsets formed from a file of data records, comprising:

means for creating a data subset object comprising a list of record IDs identifying data records that are members of the data subset, the data subset object belonging to a set ID class having a record ID subclass and a subset subclass; and means for incrementally retrieving the data records listed in the list of record IDs when the set ID class is instantiated as a subset subclass.

13. The apparatus of claim 12, wherein the means for defining a data subset object comprises:

means for searching for data records in the file meeting a search criteria; and means for storing the record ID for each data record meeting the search criteria in the data subset object.

14. The apparatus of claim 12, further comprising means for incrementally retrieving the data records from the file of data records when the set ID class is instantiated as a record ID subclass.

15. The apparatus of claim 14, wherein the set ID class is instantiated in accordance with an array index.

16. The apparatus of claim 15, wherein the set ID class is instantiated to the record ID subclass when the array index is zero.

17. The apparatus of claim 14, further comprising means for creating a second data subset object comprising a list of record IDs identifying data records that are members of the second data subset, the second data subset object belonging to the set ID class.

18. The apparatus of claim 17, wherein the data records are incrementally retrieved from the first data subset object and the second data subset object according to the array index.

19. The apparatus of claim 17, wherein the means for creating a second data subset object comprises:

means for searching for data records in the first data subset object meeting a second search criteria; and means for storing the record ID for each data record meeting the second search criteria in the second data subset object.

20. The apparatus of claim 17, further comprising means for creating a third data subset object comprising a list of record IDs identifying data records that are members of the third data subset, the third data subset object belonging to the set ID class.

21. The apparatus of claim 20, wherein the means for creating a third data subset comprises the steps of performing an operation on the members of the first data subset and the members of the second data subset, and storing a list of record IDs for the members satisfying the operation in the third data subset object.

22. The apparatus of claim 21, wherein the operation is selected from the group comprising:

an ADD operation, wherein members satisfying the ADD operation include all members of the first data subset and the second data subset;

an EXCLUSIVE OR operation, wherein members satisfying the EXCLUSIVE OR operation include all members which are a member of the first data subset or the second data subset, but not a member of the first data subset and the second data subset; and an OR operation, wherein the members satisfying the OR operation are members of the first data subset and the second data subset without duplicate members.

23. A program storage device, readable by a computer, tangibly embodying one or more programs of instructions executable by the computer to perform method steps of defining and displaying data subsets formed from a file of data records, the method steps comprising the steps of:

creating a data subset object comprising a list of record IDs identifying data records that are members of the data subset, the data subset object belonging to a set ID class having a record ID subclass and a subset subclass; and incrementally retrieving the data records listed in the list of record IDs when the set ID class is instantiated as a subset subclass.

24. The program storage device of claim 23, wherein the method step of defining a data subset object comprises the method steps of:

searching for data records in the file meeting a search criteria; and storing the record ID for each data record meeting the search criteria in the data subset object.

25. The program storage device of claim 23, wherein the method steps further comprise the step of incrementally retrieving the data records from the file of data records when the set ID class is instantiated as a record ID subclass.

26. The program storage device of claim 25, wherein the set ID class is instantiated in accordance with an array index.

27. The program storage device of claim 26, wherein the set ID class is instantiated to the record ID subclass when the array index is zero.

28. The program storage device of claim 25, wherein the method steps further comprise the step of creating a second data subset object comprising a list of record IDs identifying data records that are members of the second data subset, the second data subset object belonging to the set ID class.

29. The program storage device of claim 28, wherein the data records are incrementally retrieved from the first data subset object and the second data subset object according to the array index.

30. The program storage device of claim 28, wherein the method step of creating a second data subset object comprises the method steps of:

searching for data records in the first data subset object meeting a second search criteria; and storing the record ID for each data record meeting the second search criteria in the second data subset object.

31. The program storage device of claim 28, wherein the method steps further comprise the method step of creating a third data subset object comprising a list of record IDs identifying data records that are members of the third data subset, the third data subset object belonging to the set ID class.

32. The program storage device of claim 31, wherein the method step of creating a third data subset comprises the steps of performing an operation on the members of the first data subset and the members of the second data subset, and storing a list of record IDs for the members satisfying the operation in the third data subset object.

33. The program storage device of claim 32, wherein the operation is selected from the group comprising:

an ADD operation, wherein members satisfying the ADD operation include all members of the first data subset and the second data subset;

an EXCLUSIVE OR operation, wherein members satisfying the EXCLUSIVE OR operation include all members which are a member of the first data subset or the second data subset, but not a member of the first data subset and the second data subset; and an OR operation, wherein the members satisfying the OR operation are members of the first data subset and the second data subset without duplicate members.

34. A memory structure comprising a data subset object comprising a list of record IDs identifying data records that are members of the data subset, the data subset belonging to a set ID class having a record ID subclass and a subset subclass.

* * * * *